US012663971B2

(12) United States Patent
Park et al.

(10) Patent No.: US 12,663,971 B2
(45) Date of Patent: Jun. 23, 2026

(54) COMPILING AN APPLICATION HAVING POLYNOMIAL OPERATIONS TO PRODUCE DIRECTED ACYCLIC GRAPHS HAVING COMMANDS TO EXECUTE IN A NEAR MEMORY PROCESSING DEVICE

(71) Applicant: INTERNATIONAL BUSINESS MACHINES CORPORATION, Armonk, NY (US)

(72) Inventors: Yongmo Park, Ann Arbor, MI (US); Subhankar Pal, White Plains, NY (US); Aporva Amarnath, White Plains, NY (US); Alper Buyuktosunoglu, White Plains, NY (US); Pradip Bose, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 18/424,197

(22) Filed: Jan. 26, 2024

(65) Prior Publication Data

US 2025/0244980 A1 Jul. 31, 2025

(51) Int. Cl.
| | |
|---|---|
| *G06F 8/41* | (2018.01) |
| *G06F 9/38* | (2018.01) |
| *G06F 9/455* | (2018.01) |

(52) U.S. Cl.
CPC ............ *G06F 8/4441* (2013.01); *G06F 8/443* (2013.01); *G06F 9/3836* (2013.01); *G06F 9/455* (2013.01)

(58) Field of Classification Search
CPC ...... G06F 8/4441; G06F 8/443; G06F 9/3836; G06F 9/455; G06F 15/80
See application file for complete search history.

(56) References Cited

U.S. PATENT DOCUMENTS

| | | | |
|---|---|---|---|
| 11,693,662 B2 | 7/2023 | Creeger et al. | |
| 11,764,944 B2 | 9/2023 | Liao et al. | |

(Continued)

FOREIGN PATENT DOCUMENTS

| | | |
|---|---|---|
| WO | 2025/157615 A1 | 7/2025 |
| WO | 2025/157617 A1 | 7/2025 |
| WO | 2025/157618 A1 | 7/2025 |

OTHER PUBLICATIONS

International Searching Authority, "Notification of Transmittal of the International Search Report and the Written Opinion of the International Searching Authority, or Declaration," Patent Cooperation Treaty May 2, 2025, 11 pages, International Application No. PCT/ EP2025/050757.

(Continued)

*Primary Examiner* — Geoffrey R St Leger
(74) *Attorney, Agent, or Firm* — Konrad Raynes Davda & Victor LLP; David Victor

(57) ABSTRACT

Provided are a computer program product, system, and method for compiling an application having polynomial operations to produce directed acyclic graphs having commands to execute in a near memory processing device. An application is compiled including operations on a polynomial having coefficients, decomposed into a number of levels of coefficient elements, to generate hierarchical directed acyclic graphs (DAGs) having nodes indicating commands for execution by a hierarchy of hardware components in a near memory processing (NMP) device. The hierarchy of hardware components includes a plurality of enclaves of tiles. Each tile includes memory and a processing element to perform operations on the decomposed coefficients stored in the memory of the tile. Each of the hardware components includes a controller to process the commands in the DAG generated for the hardware compo- (Continued)

nents. The DAGs are provided to a hierarchical DAG tracker to generate commands for the NMP device.

25 Claims, 21 Drawing Sheets

(56)                    References Cited

U.S. PATENT DOCUMENTS

| | | | |
|---|---|---|---|
| 2017/0060588 A1* | 3/2017 | Choi | G06F 15/80 |
| 2021/0303355 A1* | 9/2021 | Nag | G06F 12/0607 |
| 2023/0171084 A1 | 6/2023 | Kwon et al. | |
| 2023/0195320 A1 | 6/2023 | Kachare et al. | |
| 2023/0269067 A1 | 8/2023 | Son et al. | |
| 2023/0291541 A1 | 9/2023 | Gupta et al. | |

OTHER PUBLICATIONS

International Searching Authority, "Notification of Transmittal of the International Search Report and the Written Opinion of the International Searching Authority, or Declaration," Patent Cooperation Treaty May 2, 2025, 15 pages, International Application No. PCT/ EP2025/050749.

Yang et al., "FPGA Acceleration of Rotation in Homomorphic Encryption Using Dynamic Data Layout", 2023 33rd International Conference on Field-Programmable Logic and Applications (FPL), Sep. 2023. 08 pages.

Zhou et al., "FHEmem: A Processing In-Memory Accelerator for Fully Homomorphic Encryption", IEEE Transactions on Emerging Topics in Computing, Jan. 17, 2025, 14 pages.

International Searching Authority, "Notification of Transmittal of the International Search Report and the Written Opinion of the International Searching Authority, or Declaration," Patent Cooperation Treaty, Mar. 24, 2025, 15 pages, International Application No. PCT/ EP2025/050760.

Lin et al., "SongC: A Compiler for Hybrid Near-Memory and In-Memory Many-Core Architecture", IEEE Transactions on Computers, vol. 73 Issue: 10, Sep. 5, 2023, pp. 2420-2433.

Park et al., "Dramaton: A Near-DRAM Accelerator for Large Number Theoretic Transforms", IEEE Computer Architecture Letters, vol. 23 Issue: 1, Mar. 27, 2024, pp. 108-111.

A. Aikata, et al., "REED: Chiplet-Based Scalable Hardware Accelerator for Fully Homomorphic Encryption," arXiviv:2308.02885v1, Aug. 5, 2023, 14 pp.

A. Feldman, et al., "F1: A Fast and Programmable Accelerator for Fully Homomorphic Encryption," ACM, 2021, 15 pp.

D. Kwon, et al., "a 1ynm 1.25V 8Gb 16Gb/s/Pin GDDR6-Based Accelerator-in-Memory Supporting 1TFLOPS MAC Operation and Various Activation Function for Deep Learning Application," IEEE, IEEE Journal of Solid-State Circuits, vol. 58, No. 1, Jan. 2023, 12 pp.

D. Reis, et al., "Computing-in-Memory for Performance and Energy-Efficient Homomorphic Encryption," IEEE, IEEE Transactions on Very Large Scale Integration (VSLI) Systems, vol. 28, No. 11, Nov. 2020, 14 pp.

D.B. Cousins, et al., "TREBUCHET: Fully Homomorphic Encryption Accelerator for Deep Computation," arXiv:2304.05237, Apr. 2023, 6 pp.

H. Nejatollahi, et al., "CryptoPIM: In-memory Acceleration for Lattice-based Cryptographic Hardware," IEEE, 2020, 6 pp.

J. Kim, et al., "ARK: Fully Homomorphic Encryption Accelerator with Runtime Data Generation and Inter-Operation Key Reuse," IEEE, 2022, 18 pp.

J. Kim, et al., "SHARP: A Short-Word Hierarchical Accelerator for Robust and Practical Fully Homomorphic Encryption," ACM, 2023, 15 pp.

J. Park, et al., "NTT-PIM: Row-Centric Architecture and Mapping for Efficient Number-Theoretic Transform on PIM," ArXiv, arXiv:2310. 09715v1, Oct. 15, 2023, 6 pp.

J.H. Cheon, et al., "A Full RNS Variant of Approximate Homomorphic Encryption," HHS Public Access, Apr. 15, 2021, 26 pp.

J.H. Cheon, et al., "Homomorphic Encryption for Arithmetic of Approximate Numbers," ASIACRYPT 2017, Part I, LNCS 10624, 2017, 23 pp.

List of IBM Patents or Patent Applications Treated as Related, 2 pp., Jan. 26, 2024.

R. Agrawal, et al., "FAB: An FPGA-based Accelerator for Bootstrappable Fully Homomorphic," IEEE, 2023, 14 pp.

R. Geelen, et al., "BASALISC: Programmable Hardware Accelerator for BGV Fully Homomorphic Encryption," IACR Transactions on Cryptographic Hardware and Embedded Systems, ISSN 2569-2925, vol. 2023, 26 pp.

S. Kim, et al., "BTS: An Accelerator for Bootstrappable Fully Homomorphic Encryption," ACM, 2022, 15 pp.

S. Lee, et al., "a 1ynm 1.25V 8Gb 16Gb/s/Pin GDDR6-Based Accelerator-in-Memory Supporting 1TFLOPS MAC Operation and Various Activvation Function for Deep Learning Application," IEEE, IEEE Journal of Solid-State Circuits Conference, 2022, 3 pp.

U.S. Appl. No. 18/424,162, filed Jan. 26, 2024.

U.S. Appl. No. 18/424,145, filed Jan. 26, 2024.

Samardzic et al. "CraterLake: a hardware accelerator for efficient unbounded computation on encrypted data", ISCA '22: Proceedings of the 49th Annual International Symposium on Computer Architecture, Jun. 11, 2022, pp. 173-187, https://doi.org/10.1145/3470496. 3527393.

* cited by examiner

Figure 8:
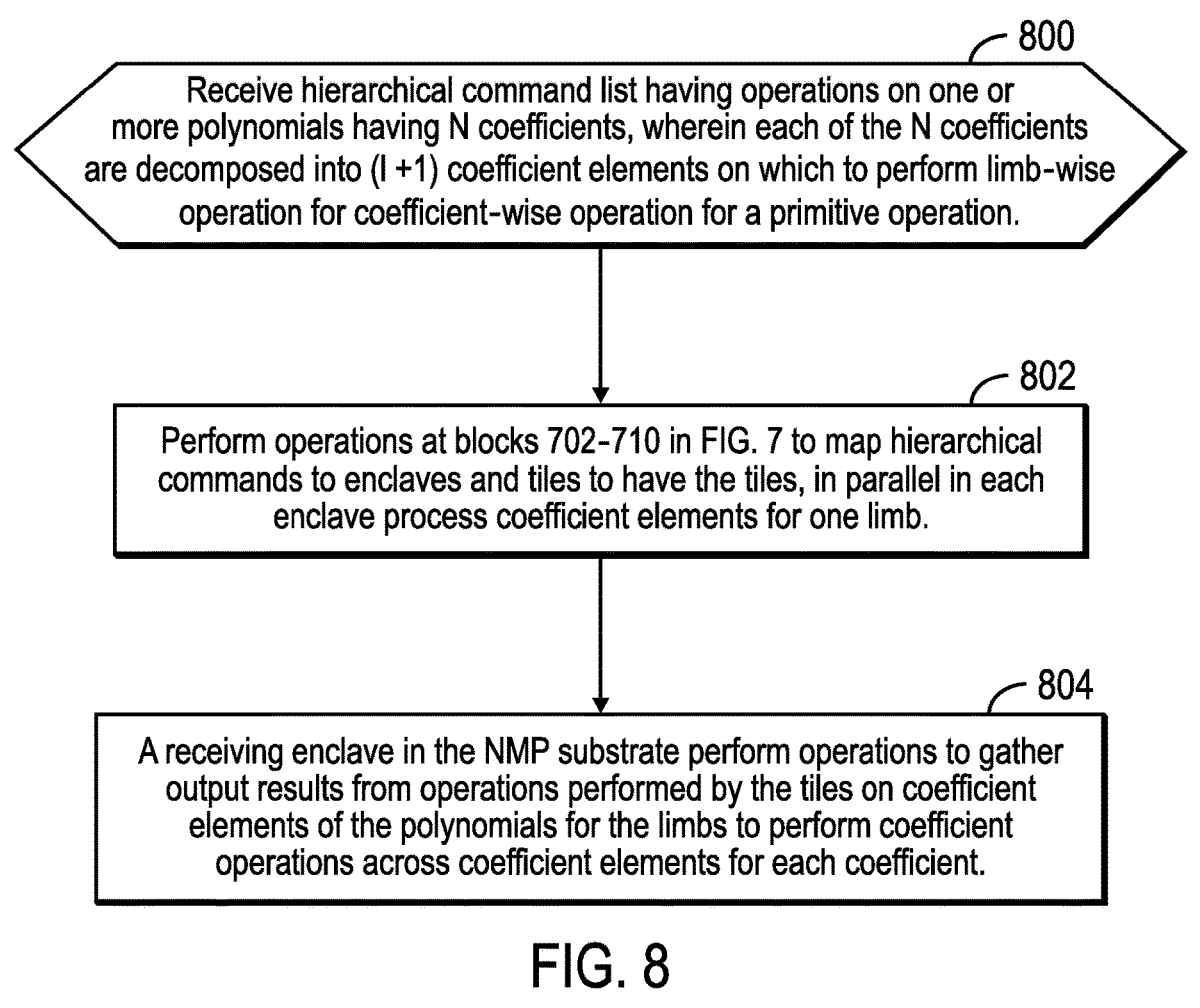

800

Receive hierarchical command list having operations on one or more polynomials having N coefficients, wherein each of the N coefficients are decomposed into (I +1) coefficient elements on which to perform limb-wise operation for coefficient-wise operation for a primitive operation.

802

Perform operations at blocks 702-710 in FIG. 7 to map hierarchical commands to enclaves and tiles to have the tiles, in parallel in each enclave process coefficient elements for one limb.

804

A receiving enclave in the NMP substrate perform operations to gather output results from operations performed by the tiles on coefficient elements of the polynomials for the limbs to perform coefficient operations across coefficient elements for each coefficient.

Figure 9:
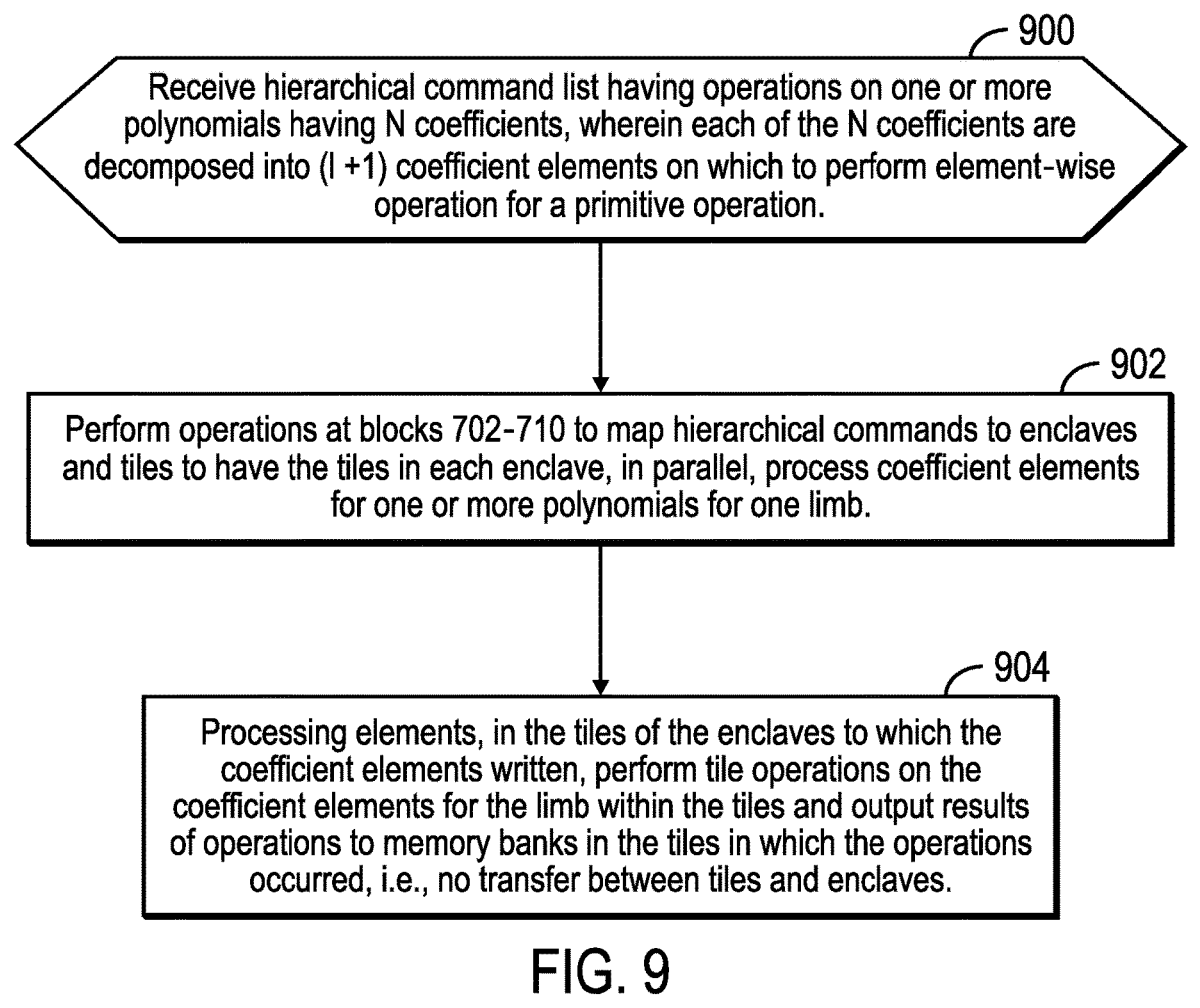

Receive hierarchical command list having operations on one or more polynomials having N coefficients, wherein each of the N coefficients are decomposed into (l +1) coefficient elements on which to perform element-wise operation for a primitive operation.

902

Perform operations at blocks 702-710 to map hierarchical commands to enclaves and tiles to have the tiles in each enclave, in parallel, process coefficient elements for one or more polynomials for one limb.

904

Processing elements, in the tiles of the enclaves to which the coefficient elements written, perform tile operations on the coefficient elements for the limb within the tiles and output results of operations to memory banks in the tiles in which the operations occurred, i.e., no transfer between tiles and enclaves.

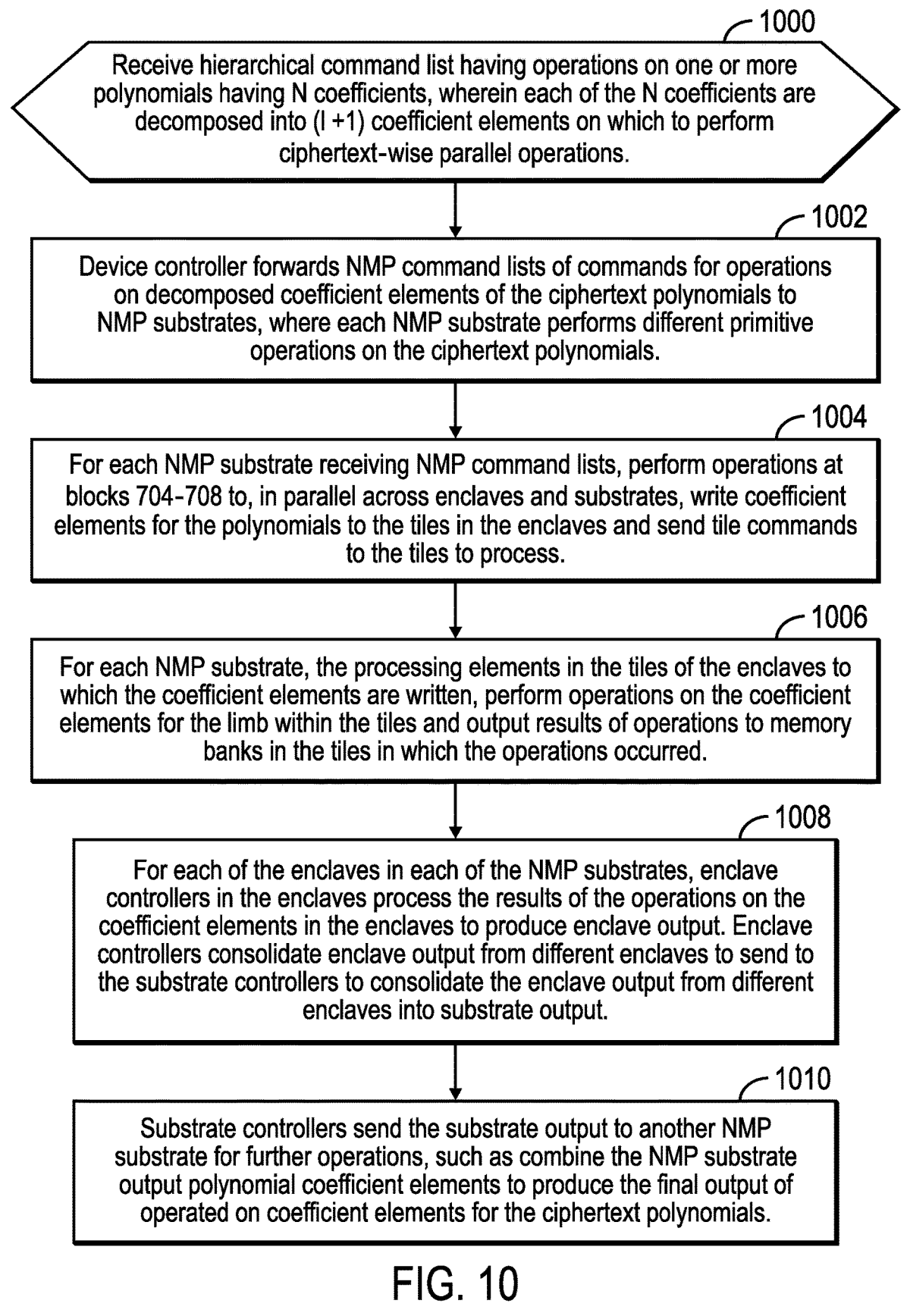

Receive hierarchical command list having operations on one or more polynomials having N coefficients, wherein each of the N coefficients are decomposed into (I +1) coefficient elements on which to perform ciphertext-wise parallel operations.

1002

Device controller forwards NMP command lists of commands for operations on decomposed coefficient elements of the ciphertext polynomials to NMP substrates, where each NMP substrate performs different primitive operations on the ciphertext polynomials.

1004

For each NMP substrate receiving NMP command lists, perform operations at blocks 704-708 to, in parallel across enclaves and substrates, write coefficient elements for the polynomials to the tiles in the enclaves and send tile commands to the tiles to process.

1006

For each NMP substrate, the processing elements in the tiles of the enclaves to which the coefficient elements are written, perform operations on the coefficient elements for the limb within the tiles and output results of operations to memory banks in the tiles in which the operations occurred.

1008

For each of the enclaves in each of the NMP substrates, enclave controllers in the enclaves process the results of the operations on the coefficient elements in the enclaves to produce enclave output. Enclave controllers consolidate enclave output from different enclaves to send to the substrate controllers to consolidate the enclave output from different enclaves into substrate output.

1010

Substrate controllers send the substrate output to another NMP substrate for further operations, such as combine the NMP substrate output polynomial coefficient elements to produce the final output of operated on coefficient elements for the ciphertext polynomials.

FIG. 10

After INTT; Initial state

1400B

Transfer input limbs to enclaves: Left to Right

1400C

Transfer input limbs to enclaves: Right to Left

1400D

Transfer input limbs to enclaves: Top to Bottom

1400E

Transfer input limbs to enclaves: Bottom to Top

1400F

Expand limbs according to enclave index

1400G

Transferred limbs are no longer needed
Accumulated the expanded limbs

1400H

NMP substrate

| $d_2^0$ | $d_2^4$ | $d_2^1$ | $d_2^5$ |

Enclave 0             Enclave 1

| $d_2^2$ | $d_2^6$ | $d_2^3$ | $d_2^7$ |

Enclave 2             Enclave 3

BConv completed

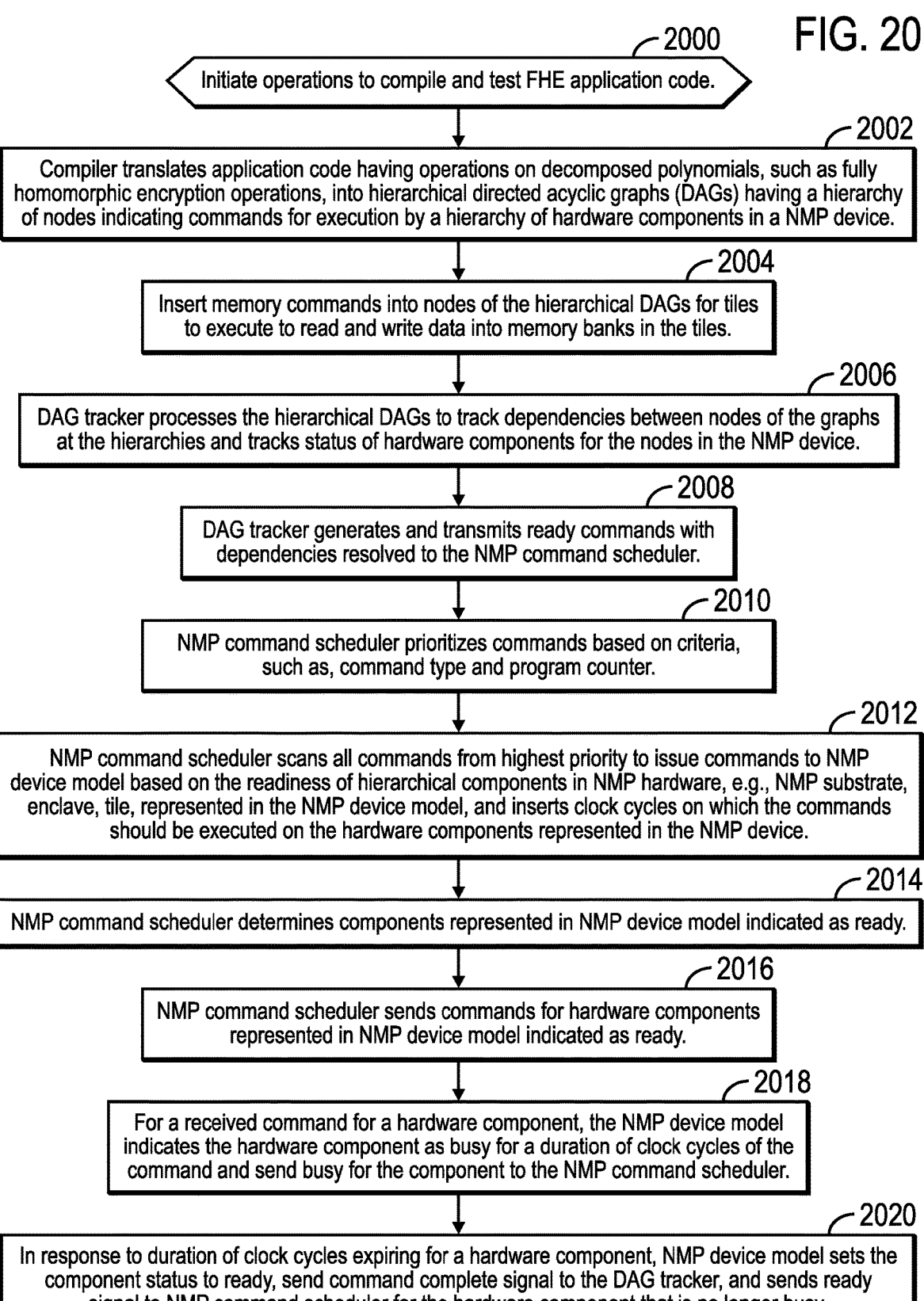

2000
Initiate operations to compile and test FHE application code.

2002
Compiler translates application code having operations on decomposed polynomials, such as fully homomorphic encryption operations, into hierarchical directed acyclic graphs (DAGs) having a hierarchy of nodes indicating commands for execution by a hierarchy of hardware components in a NMP device.

2004
Insert memory commands into nodes of the hierarchical DAGs for tiles to execute to read and write data into memory banks in the tiles.

2006
DAG tracker processes the hierarchical DAGs to track dependencies between nodes of the graphs at the hierarchies and tracks status of hardware components for the nodes in the NMP device.

2008
DAG tracker generates and transmits ready commands with dependencies resolved to the NMP command scheduler.

2010
NMP command scheduler prioritizes commands based on criteria, such as, command type and program counter.

2012
NMP command scheduler scans all commands from highest priority to issue commands to NMP device model based on the readiness of hierarchical components in NMP hardware, e.g., NMP substrate, enclave, tile, represented in the NMP device model, and inserts clock cycles on which the commands should be executed on the hardware components represented in the NMP device.

2014
NMP command scheduler determines components represented in NMP device model indicated as ready.

2016
NMP command scheduler sends commands for hardware components represented in NMP device model indicated as ready.

2018
For a received command for a hardware component, the NMP device model indicates the hardware component as busy for a duration of clock cycles of the command and send busy for the component to the NMP command scheduler.

2020
In response to duration of clock cycles expiring for a hardware component, NMP device model sets the component status to ready, send command complete signal to the DAG tracker, and sends ready signal to NMP command scheduler for the hardware component that is no longer busy.

2100

COMPILING AN APPLICATION HAVING POLYNOMIAL OPERATIONS TO PRODUCE DIRECTED ACYCLIC GRAPHS HAVING COMMANDS TO EXECUTE IN A NEAR MEMORY PROCESSING DEVICE

BACKGROUND OF THE INVENTION

1. Field of the Invention

The present invention relates to a computer program product, system, and method for compiling an application having polynomial operations to produce directed acyclic graphs having commands to execute in a near memory processing device.

2. Description of the Related Art

Fully homomorphic encryption (FHE) is an encryption technique that enables computations on encrypted data, or ciphertext, without decrypting the data to maintain the data protected at all times. Processing homomorphic operations on the encrypted data is orders of magnitude slower than operations on the unencrypted data. FHE operations are time consuming because they involve processing long and wide polynomials as operands and have low data reusability. Further, conventional hardware, such as central processing units (CPUs) and graphics processing units (GPUs) have difficulty processing polynomials efficiently due to their small on-chip memory. For these reasons, FHE operations require large off-chip data transfer between computing and memory modules.

Prior art approaches for accelerating FHE operations involve use of application specific integrated circuits (ASICs) with large on-chip memory sizes. However, even using large on-chip memory in the ASIC is not sufficient to store all of the required data, in particular, the large keys, for FHE operations, requiring data streaming from off-chip memory.

SUMMARY

Provided are a computer program product, system, and method for compiling an application having polynomial operations to produce directed acyclic graphs having commands to execute in a near memory processing device. An application, including operations on a polynomial having coefficients, is compiled to generate hierarchical directed acyclic graphs (DAGs) having nodes indicating commands for execution by a hierarchy of hardware components in a near memory processing (NMP) device. Each of the coefficients are decomposed into a number of levels of coefficient elements. The hierarchy of hardware components includes a plurality of enclaves of tiles. Each tile includes memory and a processing element to perform operations on the decomposed coefficients stored in the memory. Each of the hardware components includes a controller to process the commands in the DAG generated for the hardware components. The DAGs are provided to a hierarchical DAG tracker to generate commands for the NMP device.

Further provided are a computer program product, system, and method for compiling an application having polynomial operations to produce directed acyclic graphs having commands to execute in a near memory processing device. An application, including operations on a polynomial having coefficients, is compiled to generate commands in a hierarchical directed acyclic graph (DAG) having nodes indicating commands for execution by a hierarchy of hardware components in a near memory processing (NMP) device. Each of the coefficients are decomposed into a number of levels of coefficient elements. The NMP device includes tiles having memory with row buffers and processing elements to perform operations on the coefficient elements. The commands are forwarded to an NMP device model that models the hierarchy of hardware components in the NMP device and processes the commands to generate information on completion of the commands.

BRIEF DESCRIPTION OF THE DRAWINGS

FIG. 8 illustrates an embodiment of coefficient-wise operations on coefficient elements of polynomials.

FIG. 9 illustrates an embodiment of element-wise operations on coefficient elements of polynomials.

FIG. 10 illustrates an embodiment of ciphertext-wise operations on coefficient elements of polynomials.

FIGS. 14A through 14H illustrate the processing of the decomposed digits of the polynomials in enclaves or a near memory processing substrate as part of the base conversion operation that starts with 4 limbs and creates 4 more limbs.

FIG. 20 illustrates an embodiment of operations to compile an application having FHE operations.

DETAILED DESCRIPTION

Figure 1:
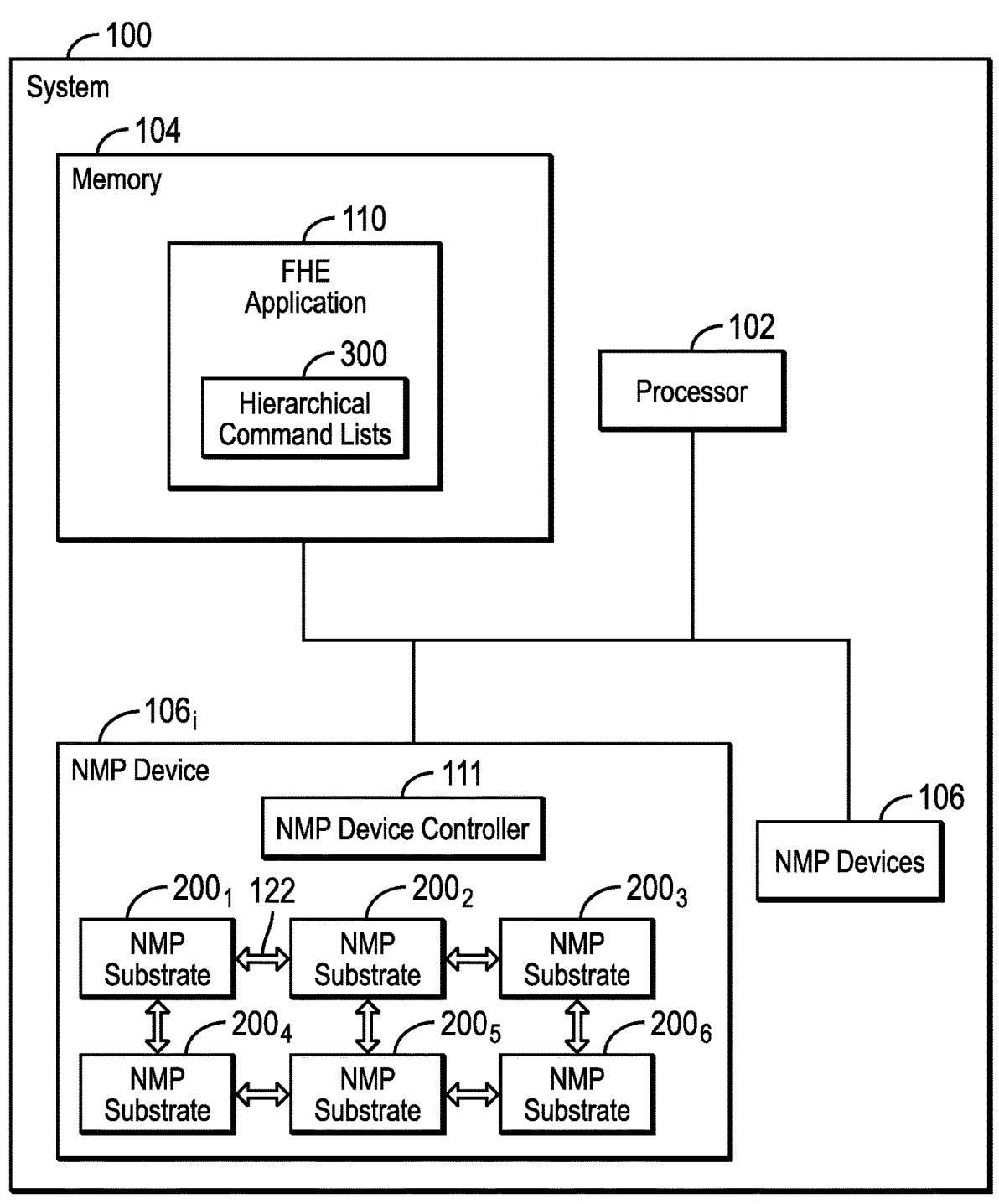
FIG. 1 illustrates an embodiment of a system for processing decomposed polynomials.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The description herein provides examples of embodiments of the invention, and variations and substitutions may be made in other embodiments. Several examples will now be provided to further clarify various embodiments of the present disclosure:

Example 1: A computer-implemented method for compiling an application having polynomial operations to produce directed acyclic graphs having commands to execute in a near memory processing device. An application is compiled including operations on a polynomial having coefficients, wherein each of the coefficients are decomposed into a number of levels of coefficient elements. Hierarchical directed acyclic graphs (DAGs) are generated having nodes indicating commands for execution by a hierarchy of hardware components in a near memory processing (NMP) device. The hierarchy of hardware components includes a plurality of enclaves of tiles, wherein an enclave comprises a plurality of tiles, wherein each tile includes memory and a processing element to perform operations on the decomposed coefficients stored in the memory of the tile. Each of the hardware components includes a controller to process the commands in the DAG generated for the hardware components. The DAGs are provided to a hierarchical DAG tracker to generate commands for the NMP device. Thus, embodiments advantageously provide a technique to map commands to a specific hierarchy of hardware components in an NMP device s to perform an operation on decomposed coefficients of a polynomial to optimize the execution of the commands on the hardware.

Example 2: The subject matter of Examples 1 and 3-6 can optionally include that the that the commands generated for the tiles include memory commands to read and write the coefficient elements in the memories in the tiles and to have the processing elements in the tiles process the coefficient elements in the memories. Thus, embodiments advantageously allow that processing elements in multiple tiles may concurrently process commands to read and write the decomposed coefficient elements of the polynomial to process the coefficient elements concurrently in the different tiles to optimize processing.

Example 3: The subject matter of Examples 1, 2 and 4-6 can optionally include that the generated commands include commands for NMP substrates on the NMP device, wherein the NMP substrates include the enclaves. Thus, embodiments advantageously allow a further division in the hierarchy of hardware components for NMP substrates in the NMP device including the enclaves to further increase the parallelism of operations by allowing enclaves in different substrates to concurrently perform operations on the decomposed coefficient elements of the polynomials to further optimize processing.

Example 4: The subject matter of Examples 1-3, 5, and 6 can optionally include that the commands generated by the compiler comprise a hierarchical command list, wherein the hierarchical command list includes an NMP substrate command list for one of the NMP substrates on the NMP device. The NMP substrate command list provides an enclave command list for an enclaves on the NMP substrate having the NMP substrate command list and the enclave command list provides primitive operations to perform on the coefficient elements. Thus, embodiments advantageously allow a distribution of commands through a hierarchical command list throughout the hardware components to allow parallelism across all tiles in separate enclaves in separate substrates, and allows parallel execution of operations at enclaves within and across substrates, and allows parallel operations across the substrates to increase parallelism at multiple levels of the hierarchical hardware components.

Example 5: The subject matter of Examples 1-4, and 6 can optionally include that the enclave command list provides a tile command list for each primitive operation indicated on the enclave command list. The tile command list includes memory commands and operations to perform on the coefficient elements within a tile to implement the primitive operation for which the tile command list is provided. Thus, embodiments advantageously allow one enclave to concurrently process different primitive operations by having a tile command list for each tile in the enclave process a different primitive. This allows optimization of operations by having parallel processing of primitives across tiles in different enclaves to allow primitives used to process the operation on the decomposed coefficient elements to be concurrently processed.

Example 6: The subject matter of Examples 1-5 can optionally include that each level of coefficient elements comprises a limb. The commands include commands to process coefficient elements for one limb in the tiles of only one enclave. Thus, embodiments advantageously allow for commands to process decomposed coefficient elements organized in limbs of the polynomial by allowing enclaves to process in parallel the coefficient elements for the limbs. Thus, the compiled command list allows parallel processing across limbs of decomposed coefficient elements of the polynomial in the enclaves.

Example 7: A computer-implemented method for compiling an application having polynomial operations to produce directed acyclic graphs having commands to execute in a near memory processing device. The method comprises a compiler compiling an application including operations on a polynomial having coefficients, wherein each of the coefficients are decomposed into a number of levels of coefficient elements, to generate commands in a hierarchical directed acyclic graph (DAG) having nodes indicating commands for execution by a hierarchy of hardware components in a near memory processing (NMP) device. The NMP device includes tiles having memory with row buffers and processing elements to perform operations on the coefficient elements. The method further comprises forwarding the commands to an NMP device model that models the hierarchy of hardware components in the NMP device and processes the commands to generate information on completion of the commands. Thus, embodiments advantageously allow for testing of commands, generated from a DAG having nodes representing hardware components in an NMP device, at an NMP device model that models the hierarchy of components in the NMP device to generate information on completion and execution of the commands for testing purposes to test the compilation of the commands without the need for testing on the actual hardware.

Example 8: The subject matter of Examples 7 and 9-11 can optionally include that the method further comprises indicating, by the NMP device model, a hardware component, in the hierarchy of hardware components, as busy for a duration of clock cycles to process a command received for the hardware components. Thus, embodiments advantageously have the NMP device model simulate operation of the hardware components by indicating hardware components as busy for a command received for the hardware components to simulate how the hardware components process the commands without having to test the commands on an actual NMP device.

Example 9: The subject matter of Examples 7, 8, 10, and 11 can optionally include that the method further comprises assigning, by a command scheduler, clock cycles for the commands indicating the clock cycle at which each of the commands is executed in the hierarchy of components. The NMP device model indicates a hardware component as busy in response to the hardware component executing a command at the clock cycle assigned by the command scheduler. Thus, embodiments advantageously allow the testing of the timing of execution of commands at clock cycles in the NMP device to determine whether commands are executing in parallel at the correct times by having the NMP model simulate the hardware components executing a command at a clock cycle as busy.

Example 10: The subject matter of Examples 7-9 and 11 can optionally include that the method further comprises the hardware components of the hierarchy of components includes an NMP substrate on the NMP device, wherein the NMP substrates include a plurality of enclaves, wherein each enclave comprises a plurality of interconnected tiles. Each tile includes memory and a processing element to perform operations on decomposed coefficients stored in the memory of the tile. The NMP device model provides a model of the NMP substrates on the NMP device, the enclaves on the NMP substrates, and the tiles in the enclaves. Thus, embodiments advantageously allow the NMP device model to implement a hierarchy of hardware components that operate in parallel at different levels of the hierarchy by modeling NMP substrates in the NMP device, enclaves in the NMP substrates, and tiles in the enclaves, to allow modeling and testing across tiles in enclaves and enclaves in NMP substrates.

Example 11: The subject matter of Examples 7-10 can optionally include that the method further comprises processing, by a DAG tracker, the DAGs and commands to process at the DAG nodes for the components in the hierarchy of components to track a status of processing the commands and track dependencies of the components. The method further comprises determining, by a command scheduler, clock cycles for ready commands from the DAG tracker. The method further comprises sending, by the command scheduler, commands to the NMP device model in response to receiving a signal from the NMP device model that a component represented in the NMP device model is ready to process commands. The method further comprises returning, by the NMP device model, indication of completed commands to the DAG tracker. Thus, embodiments advantageously assign clock cycles to commands at the hierarchical level of nodes of the DAG tracker representing the hierarchy of hardware components in the NMP device to allow parallelism at multiple levels of the hierarchy by having the different levels perform commands or operations on the same clock cycles in that level of the hierarchy.

Example 12 is an apparatus comprising means to perform a method of any of the Examples 1-11.

Example 13 is a machine-readable storage including machine-readable instructions, when executed, to implement a method or realize an apparatus of any of the Examples 1-11.

Example 14: A system comprising one or more processor and one or more computer-readable storage media collectively storing program instructions which, when executed by the processor, are configured to cause the processor to perform a method according to any of Examples 1-11.

Example 15: A computer program product comprising one or more computer readable storage media, and program instructions collectively stored on the one or more computer readable storage media, the program instructions comprising instructions configured to cause one or more processors to perform a method according to any one of Examples 1-11.

Current computational cryptographic operations suffer from large data sizes and bandwidth constraints. Described embodiments provide improvements to computer technology for processing cryptographic and FHE operations by providing an implementation of a Near-DRAM processing (NDP) architecture to reduce the data movement between memory and processor by processing data-intensive computations close to the Dynamic Random Access Memory (DRAM), without having to stream data off-chip, leading to better performance and energy efficiency. Near-DRAM processing may utilize DRAM internal high bandwidth and energy-efficient (pJ/bit) memory access, which is far more efficient and faster than accessing DRAM memory from off-chip. The high density of DRAM cells enables up to 100 s of GBs memory capacity that can be used directly for computation.

Described embodiments provide a near memory processing (NMP) hierarchical architecture of an NMP device having a plurality of NMP substrates, where each substrate includes a plurality of enclaves. Each enclave, in turn, includes a plurality of tiles. In certain embodiments, each tile includes pairs of DRAM banks with memory buffers, labeled even and odd banks, and one or more processing elements (PEs). Described embodiments apply the NMP hierarchical architecture to perform parallel processing of coefficient elements derived from a decomposition of a polynomial having N coefficients to produce a number of levels of decomposed coefficient elements. Each level of coefficient elements comprises a limb. Described embodiments assign the coefficient elements for one limb to a single enclave to process, so that coefficient elements for different limbs may be processed in parallel in different enclaves of an NMP substrate.

The described NMP architecture embodiments leverage the high capacity of DRAM, to execute end-to-end cryptographic operations without data streaming from off-chip memory, leading to better performance and energy efficiency. Described embodiments provide an NMP architecture with data placement and execution schemes for different data access patterns in FHE and other cryptographic primitives. The described NDP architecture embodiments support different data access patterns in cryptographic computation primitives. Described embodiments provide a data placement and execution scheme enabling parallelism for all different data access patterns in FHE and other cryptographic primitives.

FIG. 1 illustrates a system 100 to perform homomorphic encryption operations, and includes a processor 102, such as one or more processor and cores, a memory 104 and near memory processing (NMP) devices 106 that communicate over a bus 108. A memory 104 contains an FHE application 110 having homomorphic encryption operations on ciphertext polynomials. The application 110 includes hierarchical command lists 300 that map commands to perform operations on decomposed polynomials to a hierarchy of hardware components in the NMP devices 106 to perform operations on coefficient elements comprising decomposed polynomial coefficients in parallel.

An NMP device $106_i$, comprising one of the NMP devices 106, includes an NMP device controller 111 to distribute commands 118 to a plurality of NMP substrates $200_1$, $200_2$ . . . $200_n$, which perform primitive operations on ciphertext polynomials. The NMP devices 106, may comprise a semiconductor device or package, and the NMP substrates $200_1$, $200_2$ . . . $200_n$ may comprise a substrate or sub-processing units of the NMP device $106_i$. The NMP substrates $200_1$, $200_2$ . . . $200_n$ may comprise chiplets on a semiconductor package. In the embodiment of FIG. 1, each of the NMP substrates $200_i$ can communicate with neighboring NMP substrates via substrate communication paths, such as communication path 122.

Described embodiments are described with respect to decomposed polynomial operations. The decomposed polynomial operations may be performed for FHE operations and other polynomial operations that are not FHE operations.

Figure 2:
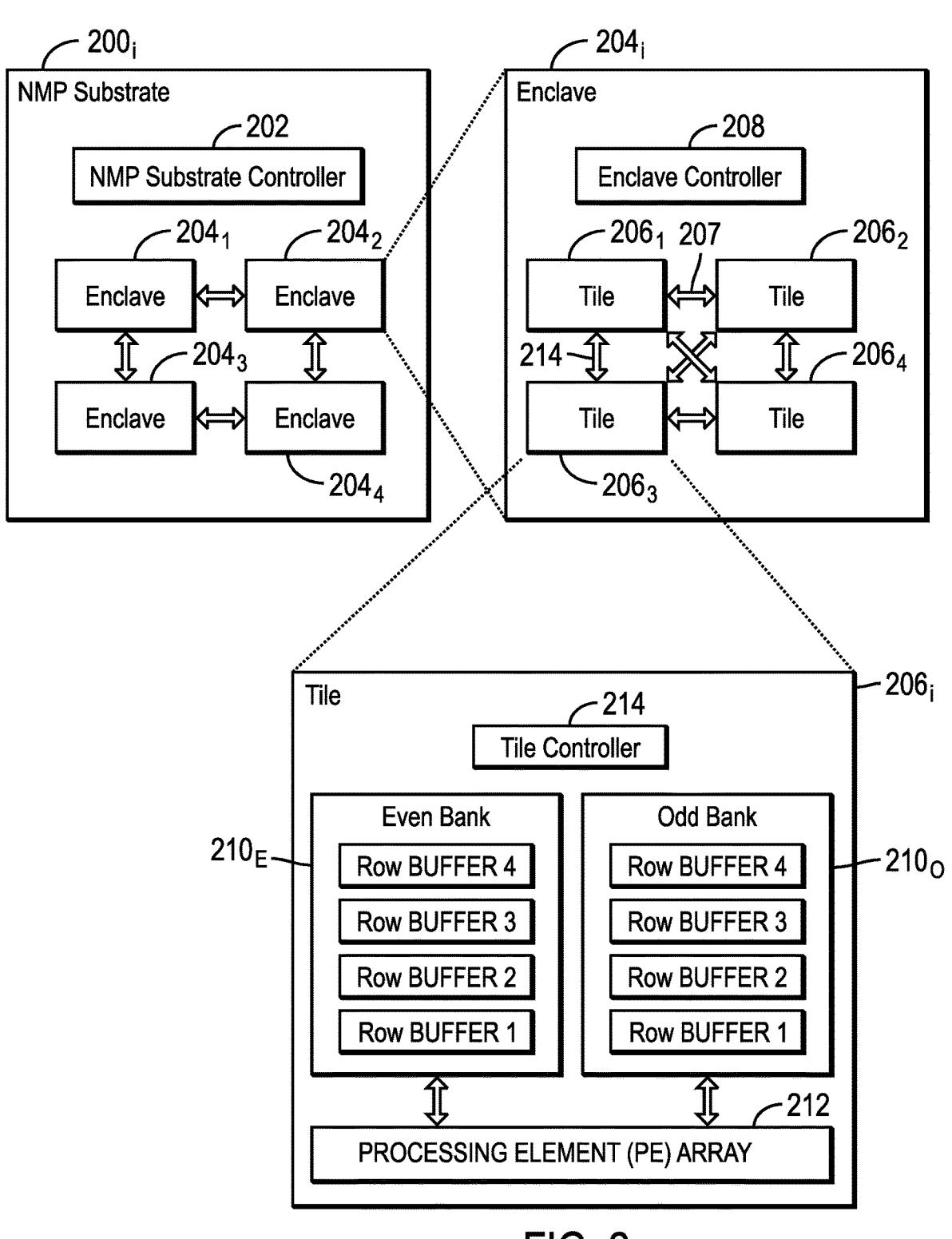
FIG. 2 illustrates an embodiment of a near memory processing device substrate.

FIG. 2 illustrates an embodiment of the components and sub-components of an NMP substrate $200_i$, and includes an NMP substrate controller 202 to distribute commands to a plurality of enclaves $204_1$, $204_2$, $204_3$, $204_4$ of the substrate $200_i$. Each enclave $204_i$ on an NMP substrate $200_i$ includes a plurality of processing tiles $206_1$, $206_2$, $206_3$, $206_4$ and an enclave controller 208 to distribute commands to the tiles $206_1$, $206_2$, $206_3$, $206_4$. Each of the tiles $206_i$ includes near memory components, such as an even bank $210_E$ and odd bank $210_O$ with row buffers to store data that may be accessed and processed by a processing element (PE) array 212, which consists of one or more PEs. The even $210_E$ and odd $210_O$ banks with row buffers may be implemented in a memory device such as a DRAM and other suitable high-density memory devices.

FIG. 2 shows a double bank architecture of the memory. Both banks $210_E$ and $210_O$ may have source data, and one of the double banks is for destination of the operations on the source data. Each of the double banks $210_E$, $210_O$ of the tile $206_i$ may implement a quadruple-buffer architecture to keep the processing element array 212 active. While the processing element array 212 accesses input data from a row buffer, to keep the processing element array 212 active, a tile controller 214 may ACTIVATE the next row into another row buffer to receive further source data. To avoid overwriting input data in the row buffer with output from the processing element array 212, the processing element array 212 may write into another row buffer for the destination.

The NMP embodiments reduce the data movement between memory and off-chip processor by having the processing element array 212 that processes data intensive computations in nearby DRAM memory elements $210_E$, $210_O$. The processing element array 212 utilizes DRAM internal high bandwidth and energy-efficient (small pJ/bit) memory access, compared to accessing DRAM memory from off-chip. All tiles $206_1$, $206_2$, $206_3$, $206_4$ may be interconnected, such as with connection 207. In one embodiment, tile-to-tile connections may consist of a network of MUXes. The processing element array 212 may comprise a set of reconfigurable processing elements designed to perform different operations involved in cryptographic arithmetic, such as modular additions, subtractions, multiplications, and modular power-of-2 radix Cooley-Tukey and Gentleman-Sande butterflies.

The memory 104 and $210_E$ and $210_O$ may comprise a suitable volatile or non-volatile memory devices known in the art to store program components for execution, such as DRAM.

The controllers 111, 202, 208, and 214 may comprise a hardware device having programmable code, such as firmware, to perform the operations of the hierarchical components of the NMP device $106_i$, including an NMP substrate controller 202, enclave controller 208, and tile controller 214.

Figure 3:
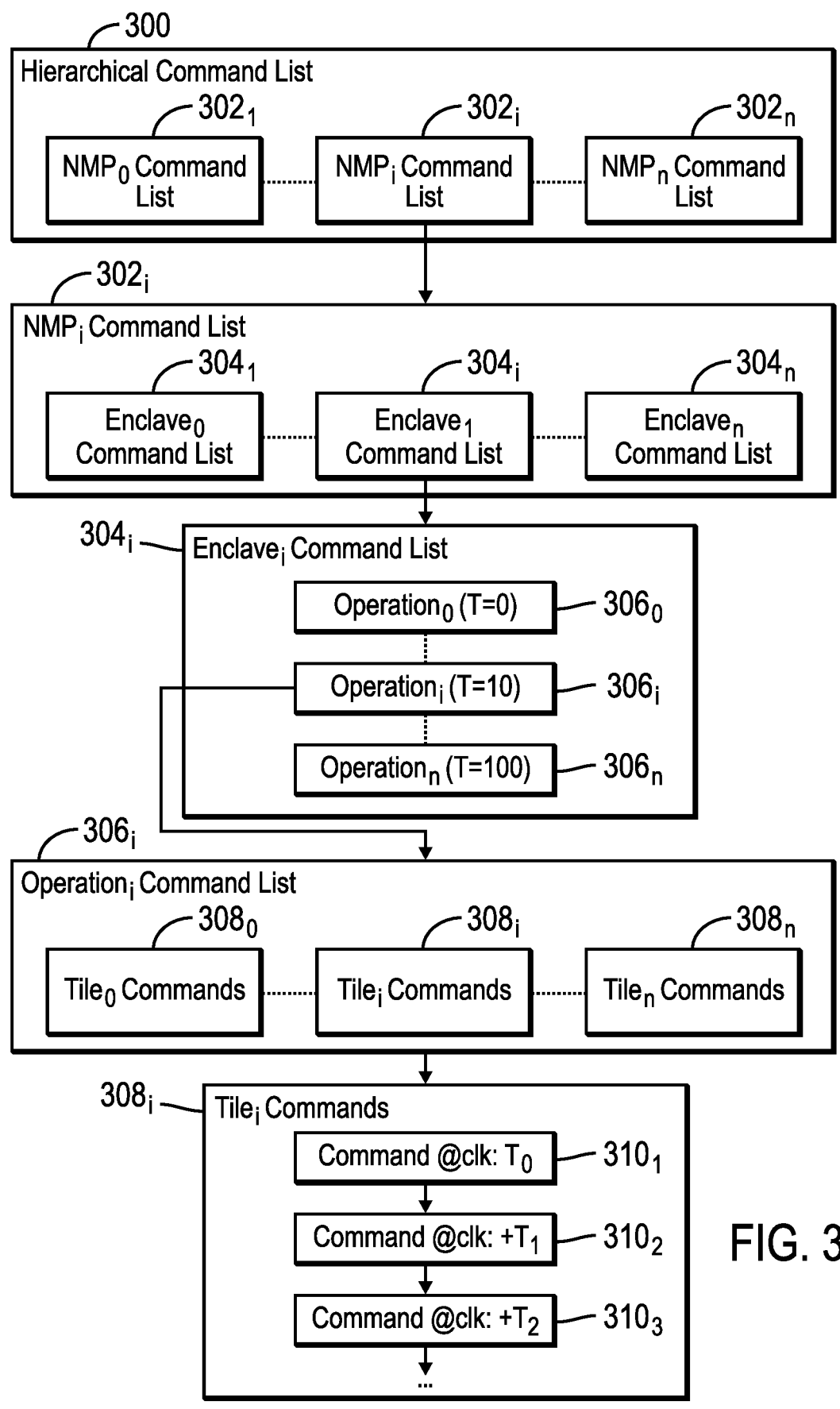
FIG. 3 illustrates an embodiment of a hierarchical command list for processing at a near memory processing device.

FIG. 3 illustrates an embodiment of a hierarchical command list 300, and its subcomponents, such as the commands that map to NMP substrates $200_i$, enclaves $204_i$, and tiles $206_i$ of an NMP device $106_i$. The hierarchical command list 300, to be processed by the NMP device controller 111, includes one or more NMP command lists $302_0$ . . . $302_i$ . . . $302_n$, which are distributed to NMP substrate controllers 202. Each NMPi command list $302_i$ includes one or more enclave command lists $304_0$ . . . $304_i$ . . . $304_n$, which the NMP substrate controller 202 transmits to the target enclaves $204_j$. Each enclave command list $304_i$ that includes operation command lists $306_0$ . . . $306_i$ . . . $306_n$ is distributed to the tiles $206_i$ in the enclave $204_i$ by the enclave controller 208. The tile $206_i$ receiving the enclave command list $304_i$ performs the operations $306_i$ on the list. Each operation command list $306_i$ includes tile commands $308_0$ . . . $308$ . . . $308_n$ for the processing element array 212 and the memory banks $210_E$ and $210_O$ of the tiles $206_1$, $206_2$, $206_3$, $206_4$ to execute, such as commands $310_1$, $310_2$, $310_3$. The timing sequence specified in the commands $310_1$, $310_2$, $310_3$, e.g., @clk: +Tj may be set when generating the issued commands 118, such as a hierarchical command list 300, including specific timing for the processing element array 212 to execute and process coefficient elements and other data stored in the banks $210_E$, $210_O$.

The operations $306_i$ in the enclave command list $304_i$ and the commands in the tile commands $308_i$ include clock cycles indicating a timing on which they are executed in their respective enclave $204_i$ and tile $206_i$, respectively. In this way, operations at the enclave level and tile level can be controlled to execute in different enclaves and tiles at the same time to allow for parallelism at different levels of the hierarchy. Thus, when the NMP command list $302_i$ and the enclave command lists $304_i$ are distributed to substrates and then enclaves, the execution of the operations $306_i$ and commands 310; would occur at the same time in the different enclaves $204_i$ and tiles $206_i$ to provide for parallelism of the computations on the coefficient elements in the tiles $206_i$.

The command list 300 provides a hierarchical mapping of commands to different hierarchical components in the NMP device $106_i$. The mapping in the command list 300 may be based on directed acyclic graphs that provide a hierarchy of operations at nodes in the graph corresponding to the hierarchy of components in an NMP device $106_i$.

In described embodiments, variables such as i and n may denote different numbers when used in different instances.

Figure 4:
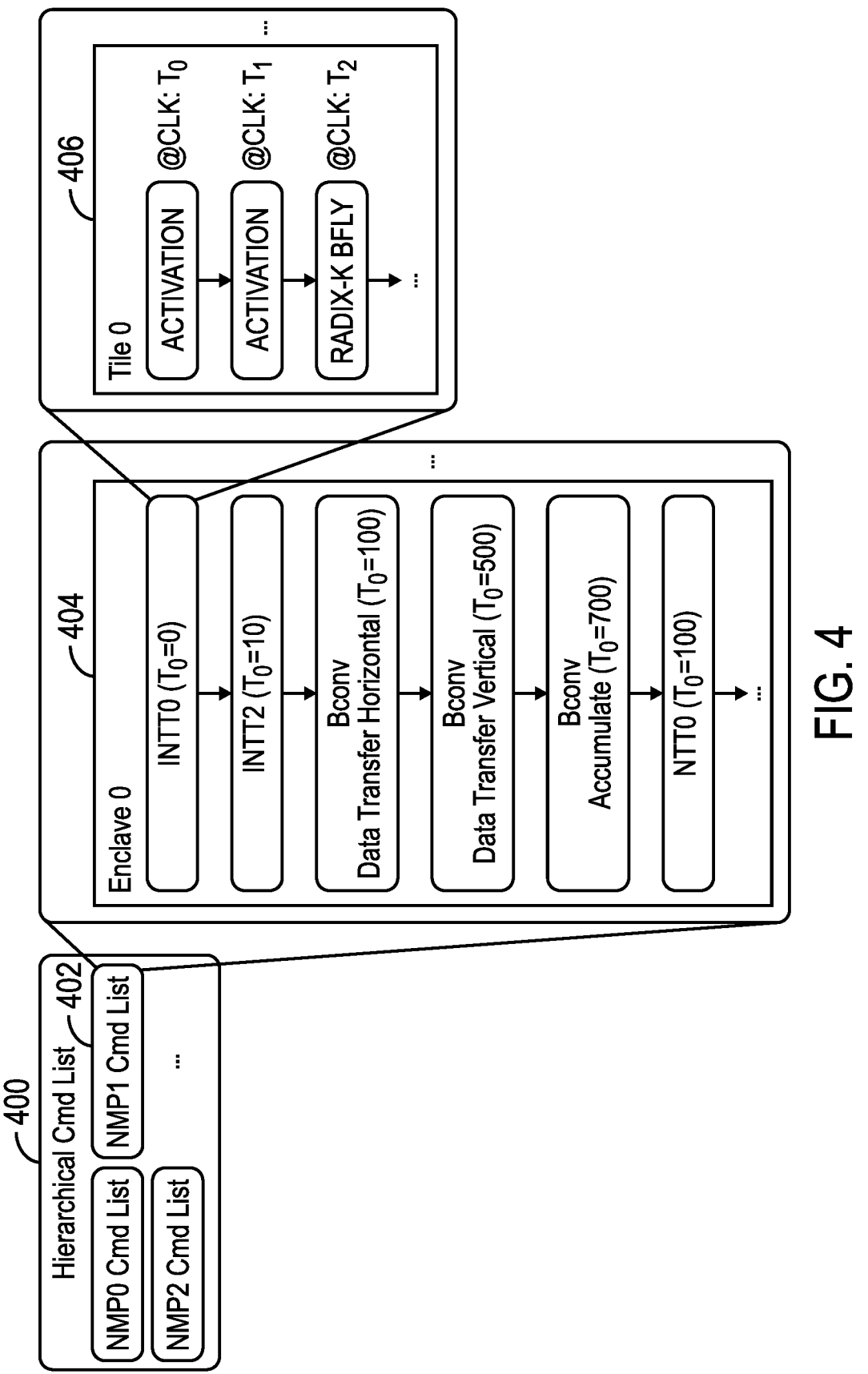
FIG. 4 illustrates an example of a hierarchical command list.

FIG. 4 provides an example of a hierarchical command list 400, or an instance of command list 300, that provides NMP command lists for the NMP substrates $200_i$. NMP command list 402 is expanded to show the enclave command list 404 having primitive commands provided for enclave 0, such as an Inverse Number Theoretic Transform (INTT) and base conversion (Bconv) commands, such as Bconv horizontal data transfer, vertical data transfer, and accumulation. The timing for executing the commands in the enclave command list 404 would be added by a compiler as described with respect to FIG. 17 below. Each primitive command in the enclave command list 404 would include tile commands for the tiles in an enclave, such as tile command list 406 for tile 0 in enclave 0, have commands for the tile controller 214 and processing element array 212 to execute at specific clock timing cycles indicated in the hierarchical command list 400.

Figures 5, 6:
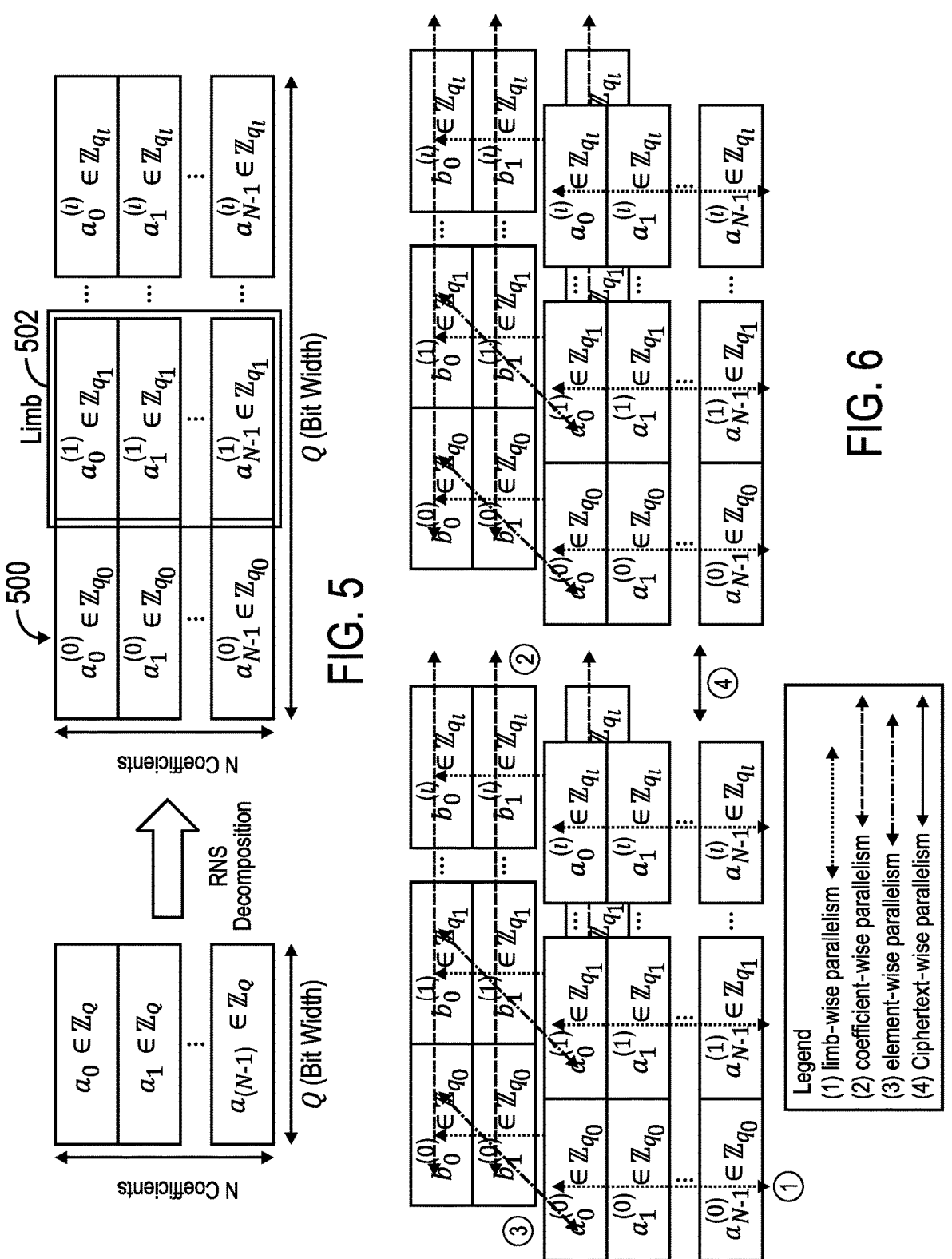
FIG. 5 illustrates an example of a Residue Number System (RNS) decomposed polynomial a(X).
FIG. 6 illustrates an example of operations on the decomposed coefficients of two polynomials in a ciphertext.

FIG. 5 shows an example of a Residue Number System (RNS) decomposition of polynomial a(X) 500 having N coefficients. Data is encoded as polynomials in fully homomorphic encryption. Polynomial $$a(X) = \sum_{j=0}^{N-1} a_j X^j \text{ in } \mathcal{R}_Q$$

is a basic operand used in CKKS-based fully homomorphic encryption (FHE) where $a_j \in \{0, 1, \ldots, Q-1\}$.

$$\mathcal{R} = \frac{\mathbb{Z}[X]}{X^N + 1}$$

is a polynomial ring with integer coefficients and $\mathcal{R}_Q$ is a residue ring of $\mathcal{R}$ modulo an integer Q. The polynomial coefficients are integer modulo Q where Q is a big integer. These values may be represented using the residue number system (RNS), s.t.

$$Q = \prod_{i=0}^{l} q_i.$$

For security reasons, Q may have a bit width ranging from few hundreds to few thousands. In RNS, a large Q can be decomposed into smaller values $q_i$ that have a bit width less than or equal to <=the machine word size, e.g., 32 or 64 bits. For $$Q = \prod_{i=0}^{l} q_i$$

and $x \in \mathbb{Z}_Q$, x can be decomposed into l+1 levels. The $i^{th}$ level comprises x mod $q_i$. Therefore, each of the N coefficients is decomposed into a number of levels of small integers. The N coefficients at one decomposition level are referred to as a "limb" 502 of the polynomial. Each decomposed coefficient j in limb l can be expressed as $$a_j^{(l)},$$

also referred to herein as a "coefficient element" of a limb. Each limb, such as limb 502, includes the decomposed coefficient elements at level $$(i), a_0^{(i)}, a_1^{(i)} \ldots a_{N-1}^{(i)}$$

of the polynomial a(X) for limb i.

FIG. 6 illustrates two ciphertexts, where each ciphertext consists of two decomposed polynomials a(X) and b(X). The lines superimposed over the two polynomials represent four different data access patterns of the coefficient elements $$a_j^{(l)} \text{ and } b_j^{(l)},$$

including (1) limb-wise parallelism, (2) coefficient-wise parallelism, (3) element-wise parallelism, and (4) ciphertext-wise parallelism.

Limb-wise parallelism involves data access across coefficient elements $$a_j^{(l)}$$

for each limb. One limb of coefficient elements is mapped to one enclave 204j. Data accesses across different coefficient elements for each limb (limb-wise parallel) are localized to an enclave 204i. The computation may be self-contained within each enclave, i.e., no enclave-to-enclave communication is needed. Multiple enclaves 204i can execute in parallel to exploit limb-wise parallelism in the application. For instance, NTT and INTT in the ciphertext (CTXT)-plaintext (PTXT) multiplication have this data access pattern.

Coefficient-wise parallelism involves data access across limbs per each coefficient in one polynomial. When a pair of ciphertexts has computations with each other, they are mapped on one NMP substrate 200i. Otherwise, they are mapped on different NMP substrates. All limbs of the pair of ciphertext having computations with each other are mapped on one NMP substrate 200i. Data accesses across limbs for each coefficient element of the N coefficients (coefficient-wise parallel) are localized to an NMP substrate 200i. To access coefficient elements across limbs, the coefficient elements for limbs distributed across enclaves 204i need to be gathered through the vertical and horizontal connections. After the gathering of all the coefficient elements across limbs for each coefficient, since there are no data access across coefficients, data transfer between tiles in each enclave is not required. Computation is self-contained within one NMP substrate 200i and different NMP substrates 200j can operate in parallel.

Element-wise parallelism involves data access across two polynomials. A subset of the coefficient elements of one limb is mapped to one tile 206i. Data accesses across elements of a polynomial with other polynomials (element-wise parallel) are localized to a tile 206i. This data access pattern does not need any data transfer between enclaves or tiles, i.e., the computation is self-contained within each tile, and different tiles can operate in parallel. Data transfers only occur within a tile.

Ciphertext-wise parallelism exploits operations on individual ciphertexts, e.g., multiplication, addition, relinearization, rescale, etc., and is exploited on different NMP substrates 200i. Communication may be required among NMP substrates (such as using link 122) to combine the results of a primitive command, which is a composite of larger operations, at one NMP substrate 200i that are performed on other NMP substrates 200j.

Figure 7:
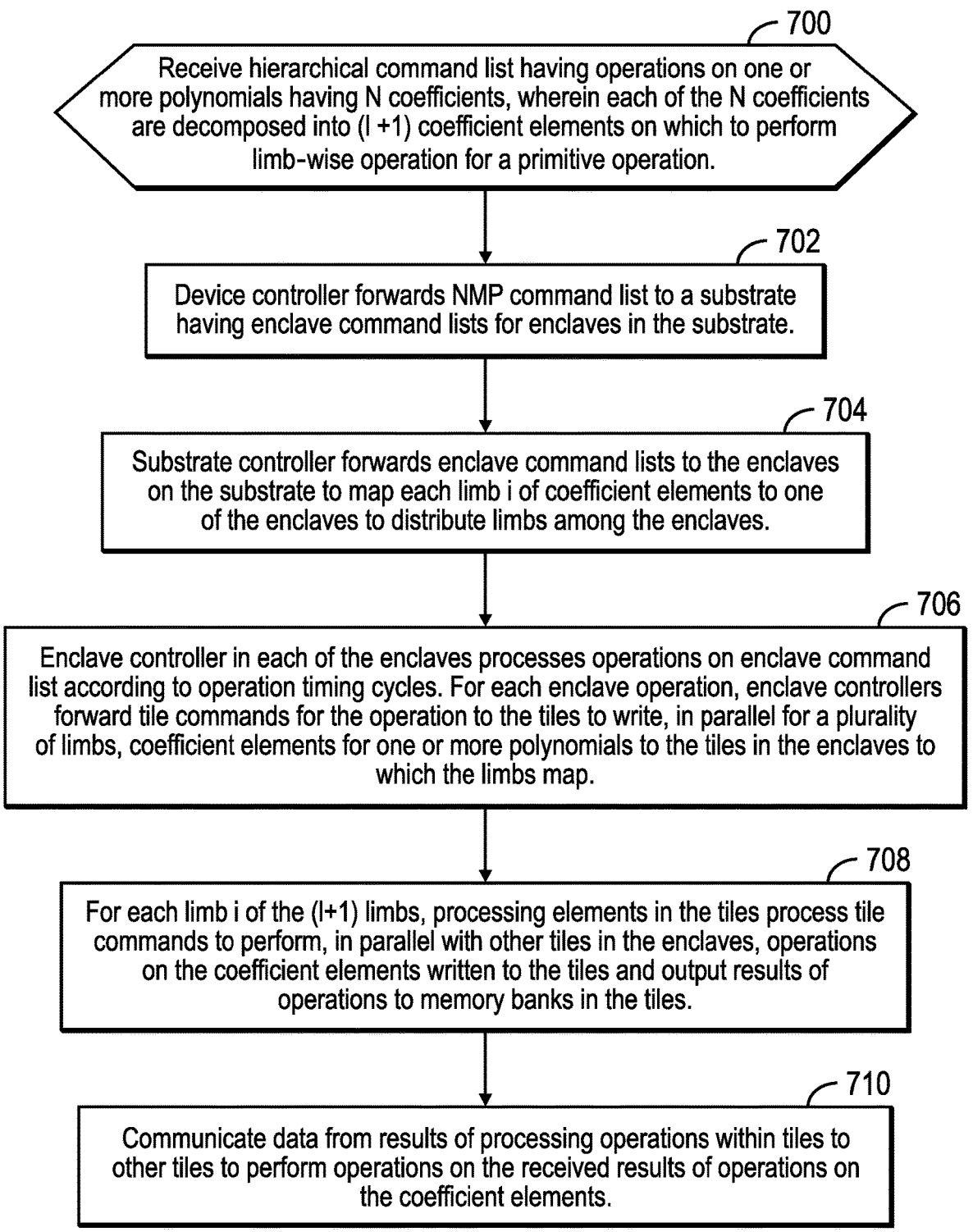
FIG. 7 illustrates an embodiment of limb-wise operations on coefficient elements of polynomials.

FIG. 7 illustrates an embodiment of operations performed in the hierarchical components of an NMP device 106 to process a hierarchical command list 300 to perform limb-wise operations performed in an NMP device 106i on one or more polynomials in ciphertext. The NMP device controller 111 receives (at block 700) a hierarchical command list 300, or hierarchical commands, to perform one or more operations one or more polynomials a(X), b(X), each having N coefficients, wherein each of the N coefficients are decomposed into (l+1) coefficient elements on which to perform limb-wise operation for a primitive operation. The NMP device controller 111 forwards (at block 702) the NMP command list $302_i$ to a substrate $200_i$ having enclave command lists $304_i$ for enclaves $204_i$ in the substrate $200_i$. The substrate controller 202 forwards (at block 704) enclave command lists $304_i$ to the enclaves on the substrate $200_i$ to map each limb i of coefficient to one of the enclaves to distribute limbs among the enclaves.

The enclave controller 208 in each of the enclaves $204_i$ processes (at block 706) operations on enclave command list $304_i$ according to operation timing cycles. For each enclave operation $306_i$, enclave controllers forward tile commands $308_i$ for the operation 306 to the tiles $206_i$ to write, in parallel for a plurality of limbs, coefficient elements for one or more polynomials to the tiles $206_i$ in the enclaves $204_i$ to which the limbs map. For each limb i of the (l+1) limbs, the processing elements 212 in the tiles $206_i$ processes the tile commands $308_i$ to perform, in parallel with other tiles $206_i$ in the enclaves $204_i$, operations on the coefficient elements written to the tiles and output results of operations to memory banks in the tiles. The processing elements 212 in the tiles, executing tile commands $310_i$, may further communicate (at block 710) data from results of processing operations within tiles to other tiles to perform operations on the received results of operations on the coefficient elements.

With the embodiment of operations of FIG. 7, limb-wise operations are performed to process the coefficient elements for different coefficients of the same limb within the tiles of the enclave to which the limb is assigned. These operations may be performed in parallel at each level of the NMP device, for instance operations at enclaves in a substrate and within tiles in the enclaves are performed in parallel using clock cycle times provided with the hierarchical commands.

FIG. 8 illustrates an embodiment of operations performed in the hierarchical components of an NMP device 106 to process a hierarchical command list 300 to perform coefficient-wise operations performed in an NMP device $106_i$ on one or more polynomials in ciphertext. The NMP device controller 111 receives (at block 700) a hierarchical command list 300, or hierarchical commands, to perform one or more operations one or more polynomials a(X), b(X), each having N coefficients, wherein each of the N coefficients are decomposed into (l+1) coefficient elements on which to perform a coefficient-wise operation for a primitive operation. The components in the NMP device $106_i$, such as the controllers 111, 202, 208, 214 and processing element array 212 perform (at block 802) the operations at blocks 702 to 710 in FIG. 7 to map hierarchical commands to enclaves and tiles to have the tiles, in parallel in each enclave process coefficient elements for one limb. A enclave controller 208 of a receiving enclave 204R in the NMP substrate $200_i$ gathers (at block 808) output results from operations performed on coefficient elements of the polynomials for the limbs to perform coefficient operations across the processed coefficient elements from different limbs.

With the embodiment of operations of FIG. 8, coefficient-wise operations are performed in parallel to process the coefficient elements from different limbs for the coefficients, to process the decomposed coefficient elements across limbs. The receiving enclave may combine the received results and perform further operations from the resulting coefficient elements for the limbs from the other enclaves.

FIG. 9 illustrates an embodiment of operations performed in the hierarchical components of an NMP device 106 to process a hierarchical command list 300 to perform element-wise operations performed in an NMP device $106_i$ on one or more polynomials in ciphertext. The NMP device controller 111 receives (at block 700) a hierarchical command list 300, or hierarchical commands, to perform one or more operations one or more polynomials a(X), b(X), each having N coefficients, wherein each of the N coefficients are decomposed into (l+1) coefficient elements on which to perform an element-wise operation for a primitive operation. The components in the NMP device $106_i$, such as the controllers 111, 202, 208, 214 and processing element array 212 perform (at block 802) the operations at blocks 702 to 710 in FIG. 7 to map hierarchical commands to enclaves and tiles to have the tiles, in parallel in each enclave process coefficient elements for one or more polynomials for one limb. For each limb i, processing elements 212 in the tiles $206_i$ of the enclave $204_i$ to which the coefficient elements are written, perform tile operations (at block 904) on the coefficient elements written to the tiles and output results of operations to memory buffers in the tiles, with no transfer between tiles and enclaves. However, data may be transferred and operated on within a tile $206j$.

With the embodiment of operations of FIG. 9, element-wise operations are performed in parallel at the enclave and tile levels to process the coefficient elements from different limbs for the coefficients.

FIG. 10 illustrates an embodiment of operations performed in the hierarchical components of an NMP device 106 to process a hierarchical command list 300 to perform ciphertext-wise operations performed in an NMP device $106_i$ on one or more polynomials in ciphertext. The NMP device controller 111 receives (at block 1000) a hierarchical command list 300, or hierarchical commands, to perform a ciphertext-wise operation on one or more polynomials a(X), b(X), each having N coefficients, wherein each of the N coefficients are decomposed into (l+1) coefficient elements on which to perform. The device controller 111 forwards (at block 1002) NMP command lists $302_i$, of enclave commands $304_i$ for operations on decomposed coefficient elements of the ciphertext polynomials, to NMP substrates $200_i$, where each NMP substrate performs different primitive operations on the ciphertext polynomials to implement the overall ciphertext-wise operation. For each NMP substrate $200_i$ receiving NMP command lists $302_i$, operations at blocks 704-708 are performed on the substrate, in parallel across enclaves and substrates, to write (at block 1004) coefficient elements for the polynomials to the tiles $206_i$ in the enclaves $204_i$ and send tile commands $308_i$ to the tiles $206_i$ to process. For each NMP substrate $200_i$, in parallel, the processing elements 212 in the tiles $206_i$ of the enclaves $204_i$ to which the coefficient elements are written, perform (at block 1006) operations on the coefficient elements for the limb within the tiles $206_i$ and output results of operations to memory banks $210_E$, $210_O$ in the tiles $206_i$ in which the operations occurred.

For each of the enclaves $204_i$ in each of the NMP substrates $200_i$, enclave controllers 208 in the enclaves $204_i$ process (at block 1008) the results of the operations on the coefficient elements in the enclaves to $204_i$ produce enclave output. Enclave controllers 208 consolidate enclave output from different enclaves $204_i$ to send to the substrate controllers 202 to consolidate the enclave output from different enclaves into substrate output. NMP substrate controllers 202 send (at block 1010) the NMP substrate output to another NMP substrate $200_j$ for further operations, such as combine the NMP substrate output coefficient elements across limbs to produce the final output of operated on coefficient elements for the ciphertext polynomials.

With the embodiment of operations of FIG. 10, the NMP substrates 200$_i$ may perform ciphertext-wise operations, such as multiplication, addition, re-linearization, rescaling etc., on the coefficient elements across limbs of the cipher-text-polynomials, and then the output of these operations may be further processed in another NMP substrate 200$_i$ to combine the results to produce the final output coefficient elements subject to the primitive operations of the NMP substrates. Further, the operations within each substrate, enclave and tiles may provide parallelism of operations at all these different levels to optimize and reduce latency of the ciphertext-wise operations.

Figure 11:
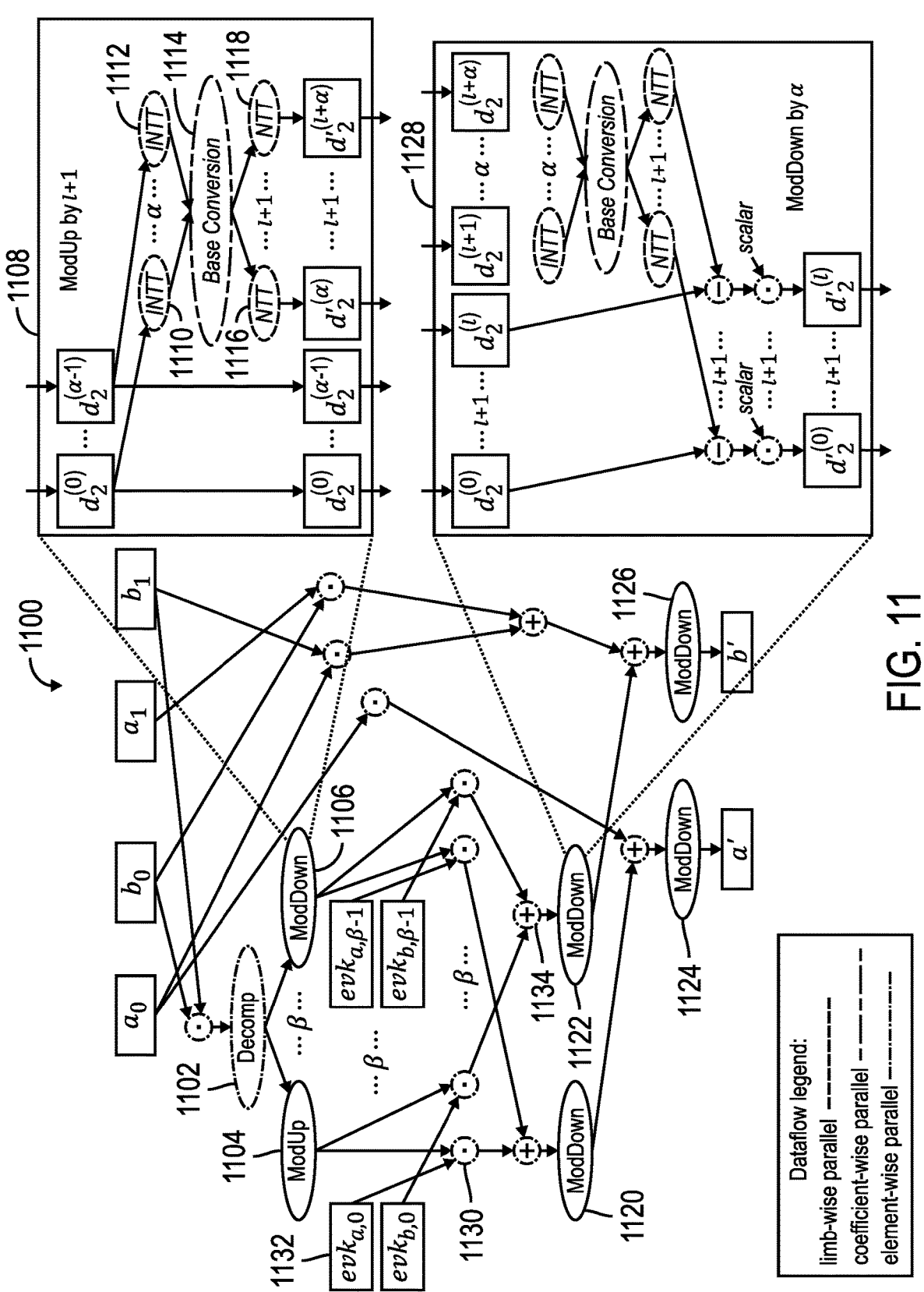
FIG. 11 illustrates an example of a dataflow of ciphertext-to-ciphertext multiplication of polynomials.

FIG. 11 illustrates a flow diagram 1100 of primitives performed on two pairs of ciphertext polynomials a$_0$, b$_0$ and a$_1$, b$_1$. The decompose function ("Decomp") 1102 splits polynomials into a number of digits d$_2$ using element-wise modular arithmetic operation. In the diagram, L+1 is the initial number of limbs in the polynomial, l+1 is the current number of limbs in the polynomial, dnum is a given decom-position number, α is $$\left\lceil \frac{L+1}{dnum} \right\rceil,$$

the number of limbs per each decomposed digit, and β is $$\left\lceil \frac{l+1}{\alpha} \right\rceil,$$

the current number of decomposed digits. Modulo raising (ModUp) operations 1104, 1106 are performed on the decomposed digits d$_2$, which comprise a coefficient element, from the decomposition operation, and details of the ModUp operations are shown in ModUp box 1108. The ModUp 1108 data flow involves a INTT operations 1110, 1112, a base conversion operation 1114, followed by l+1 NTT operations 1116, 1118. The decomp operation 1102 comprises an ele-ment-wise parallel operation on the coefficient elements of the ciphertext polynomials, the INTT 1110, 1112 and NTT 1116, 1118 operations comprise limb-wise parallel process-ing of the coefficient elements in the tiles 206$_i$, and the base conversion operation 114 comprises a coefficient-wise par-allel operation. Other operations such as modular multipli-cation and addition are shown as element-wise parallel operations. The ModDown 1120, 1122, 1124, 1126, or modulus reduction, operations are shown in ModDown data flow 1128. Certain of the multiplication operations, e.g., 1130, involves element-wise multiplication with an evalua-tion key (evk), e.g., 1132. The element-wise multiplication, e.g., 1130, and addition, e.g., 1134, operations are element-wise parallel operations.

All the different operations in the flow diagram 1100, such as the NTT, INTT, ModUp, ModDown, addition, multipli-cation, decomp operations, for a given pair of ciphertexts, (d$_0$, b$_0$) and (a$_1$, b$_1$), may be performed on a given NMP substrate 200$_i$, in parallel with other such operations on other NMP substrates. If the second ciphertext is not already resident in the given NMP substrate, it is fetched from the NMP substrate that hosts the said ciphertext. In case of ciphertexts with more than two polynomials, a similar approach applies. In this case of operations on a single ciphertext, no communication between NMP substrates is necessary.

Figure 12:
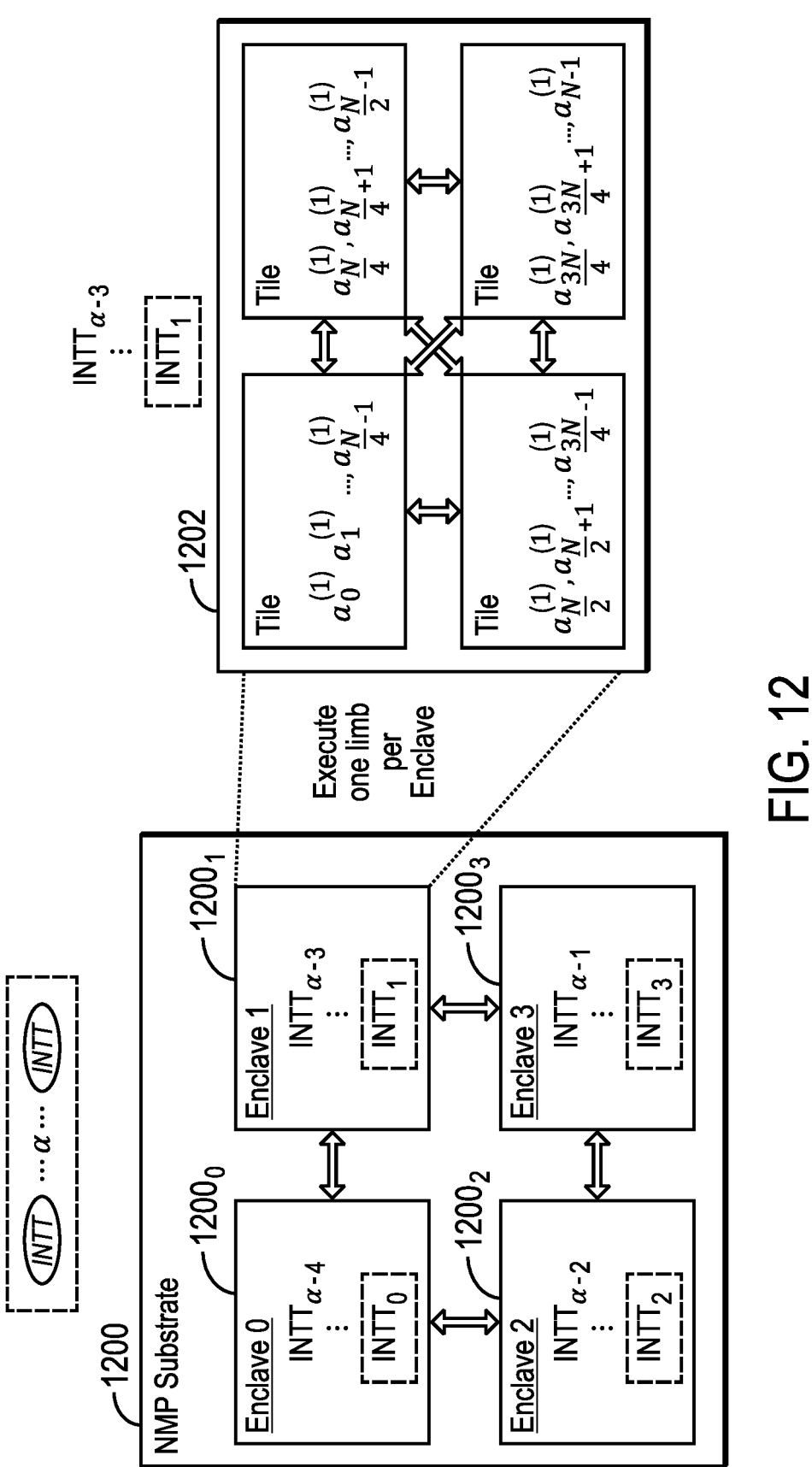
FIG. 12 illustrates an example of Inverse Number Theoretic Transform (INTT) operations in a near memory processing substrate.

FIG. 12 shows an NMP substrate 1200 having enclaves 12000, 12001, 12002, and 12003, and limbs mapped to each enclave where the INTT operation is performed. Each enclave 12000, 12001, 12002, and 12003 performs an INTT operation on a subset of the limbs. For instance, enclave 12000 performs the INTT operations for limbs 0 to α-4, where α is $$\left\lceil \frac{L+1}{dnum} \right\rceil,$$

the number of limbs per each decomposed digit. Each enclave 1200$_i$ writes a subset of the coefficient elements for a limb to the tiles 206$_i$, such as how enclave 12001 writes to tiles 1202, to perform the INTT operation on the coefficient elements for the limbs assigned to the enclaves. In this way, each enclave sequentially performs the INTT operations for the limbs assigned to that enclave.

Figure 13:
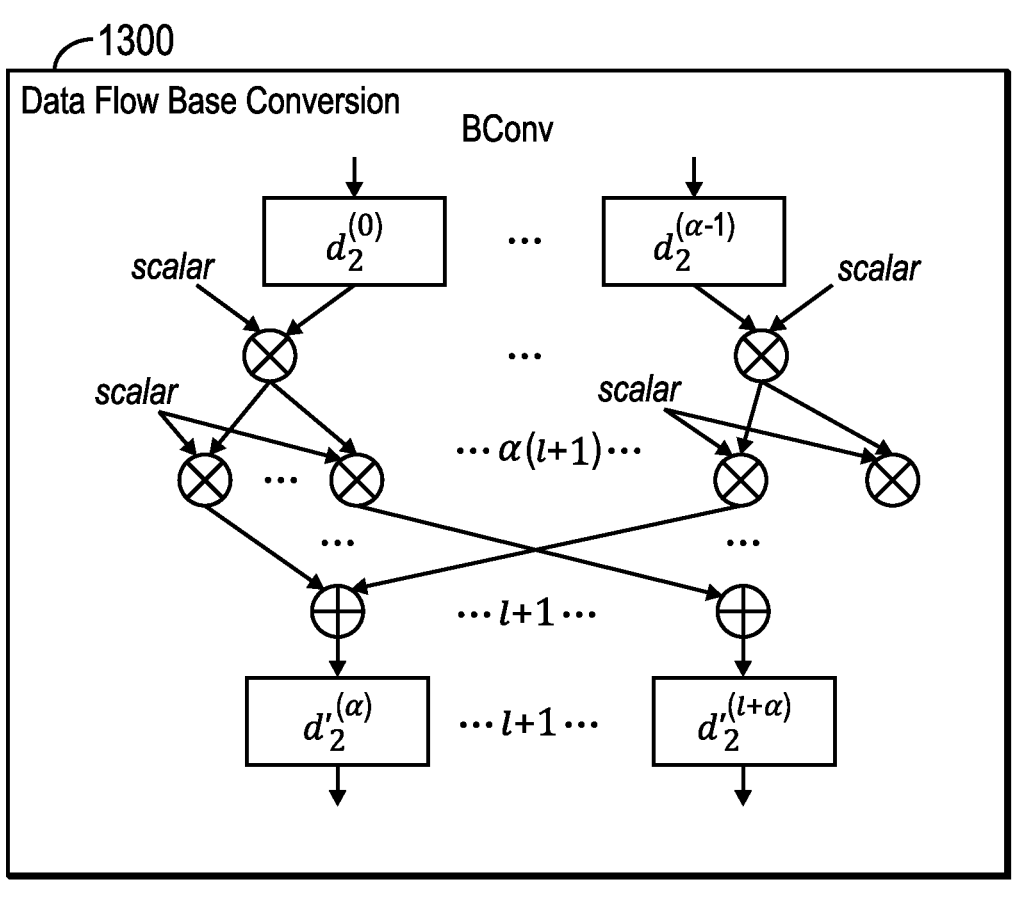
FIG. 13 illustrates an example of a dataflow for a base conversion operation.

FIG. 13 illustrates a data flow of a base conversion operation 1300, including scalar multiplication operations and an addition operation performed on the decomposed polynomial d$_2$ having a limbs. The decomposed polynomial d$_2$ is produced by an NMP substrate 200$_i$ performing the INTT operation. The result of the scalar multiplication and addition operations are modified polynomial d'$_2$ with l addi-tional limbs beyond α.

Figure 14A:
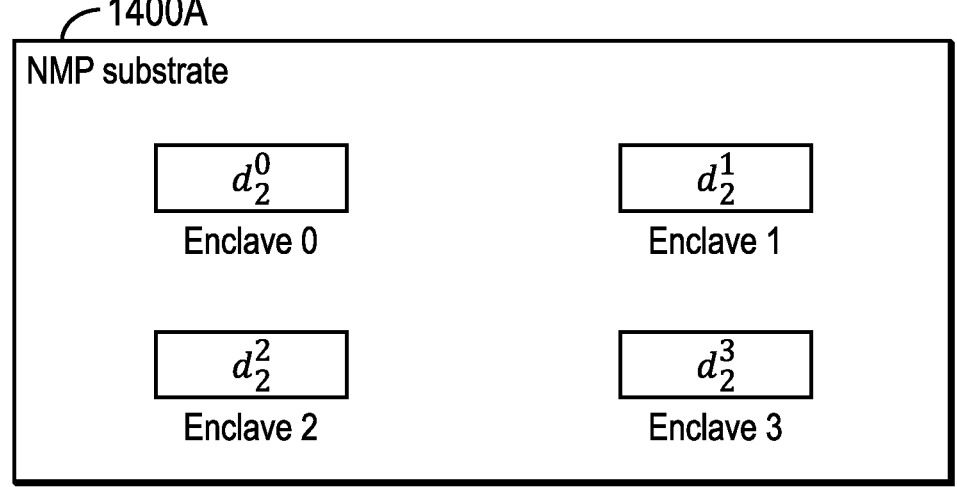
Figure 14B:
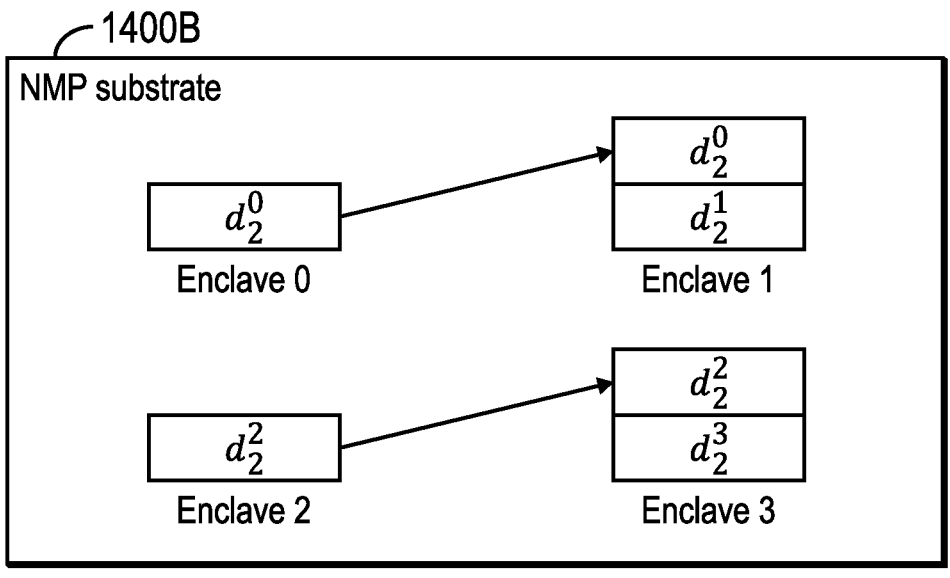
Figure 14C:
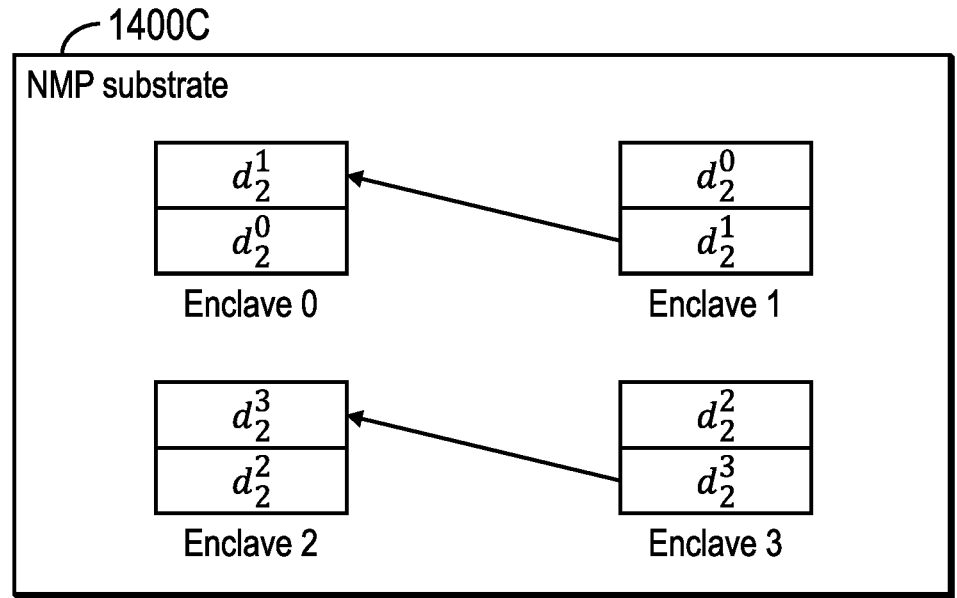
Figure 14D:
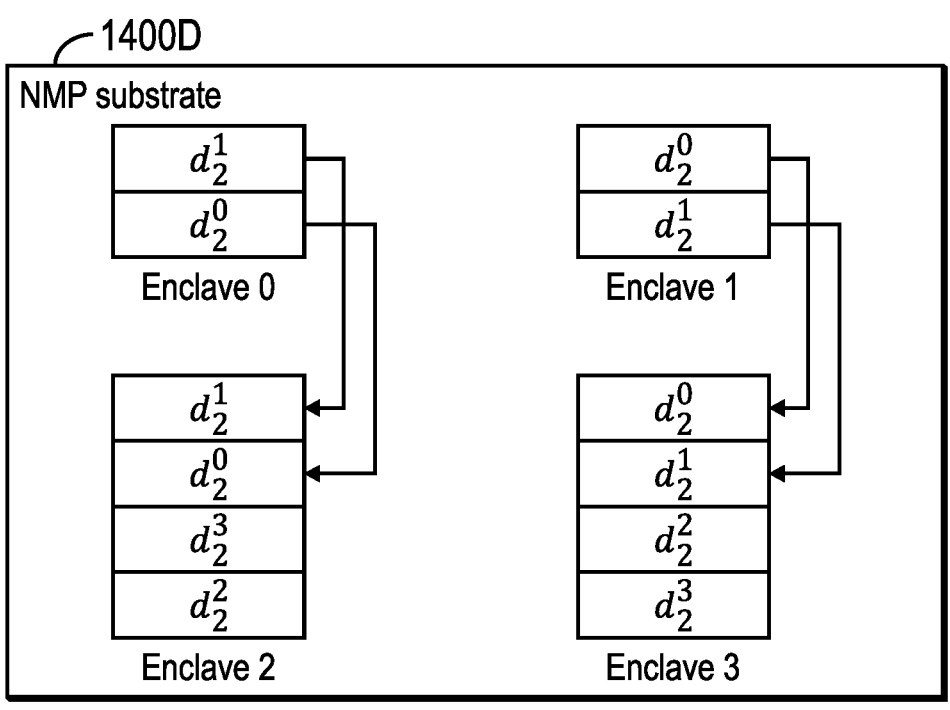
Figure 14E:
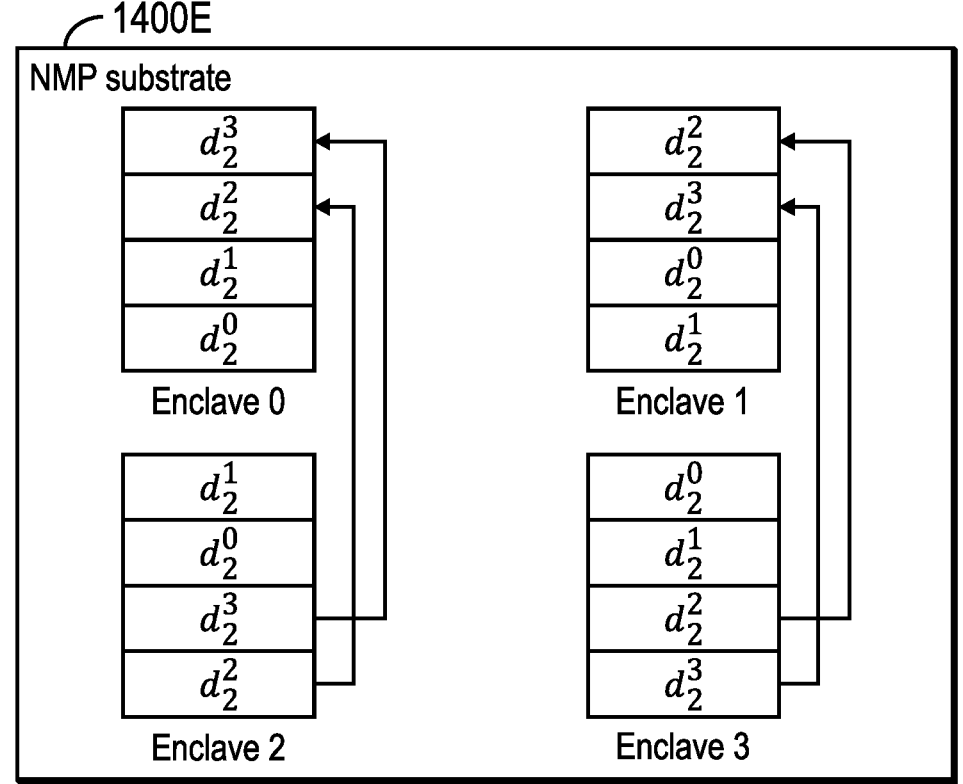

FIGS. 14A through 14H show how the enclaves 0 through 3 on an NMP substrate 1400 expand the decomposed polynomial d$_2$ to l limbs beyond a to perform the base conversion shown in FIG. 13A. FIG. 14A shows an initial state where the decomposed polynomial d$_2$ has limbs, $$d_2^l, l = 0, 1, 2, 3$$

stored in enclaves 0 . . . 3. In FIG. 14*b* the limbs $$d_2^0 \text{ and } d_2^2$$

for limbs 0 and 2 from enclaves 0 and 2 are transferred to enclaves 1 and 3, respectively. Then in FIG. 14C the limbs $$d_2^1 \text{ and } d_2^3,$$

initially in enclaves 1 and 3, are transferred to enclaves 0 and 2. FIG. 14D then shows how the limbs in enclaves 0 and 1 are respectively transferred to enclaves 2 and 3. FIG. 14E shows how digits in enclaves 2 and 3, prior to transfer of FIG. 14D, are transferred to enclaves 0 and 1.

Figure 14F:
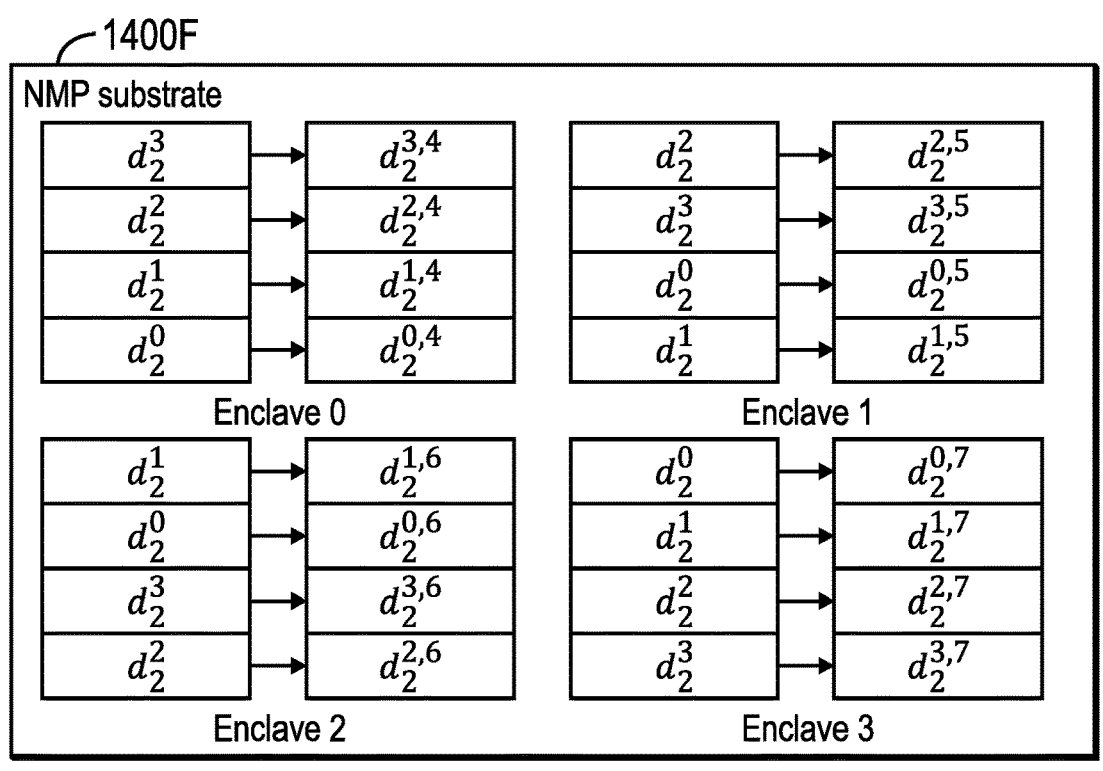
Figure 14G:
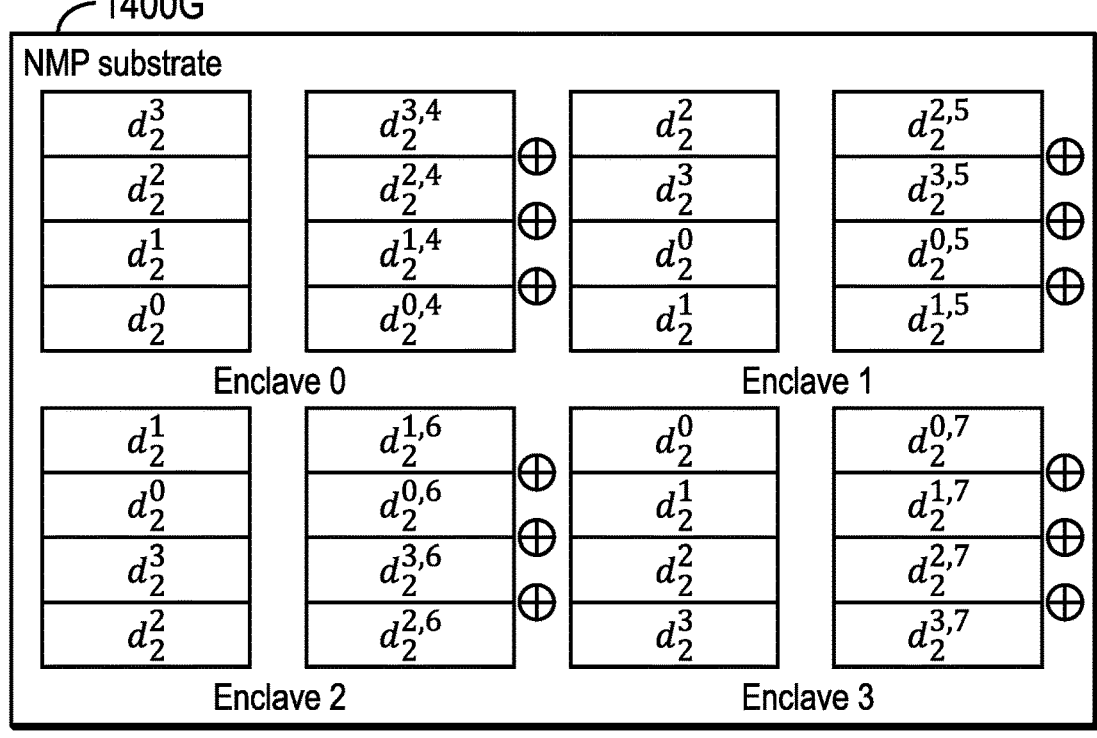
Figure 14H:
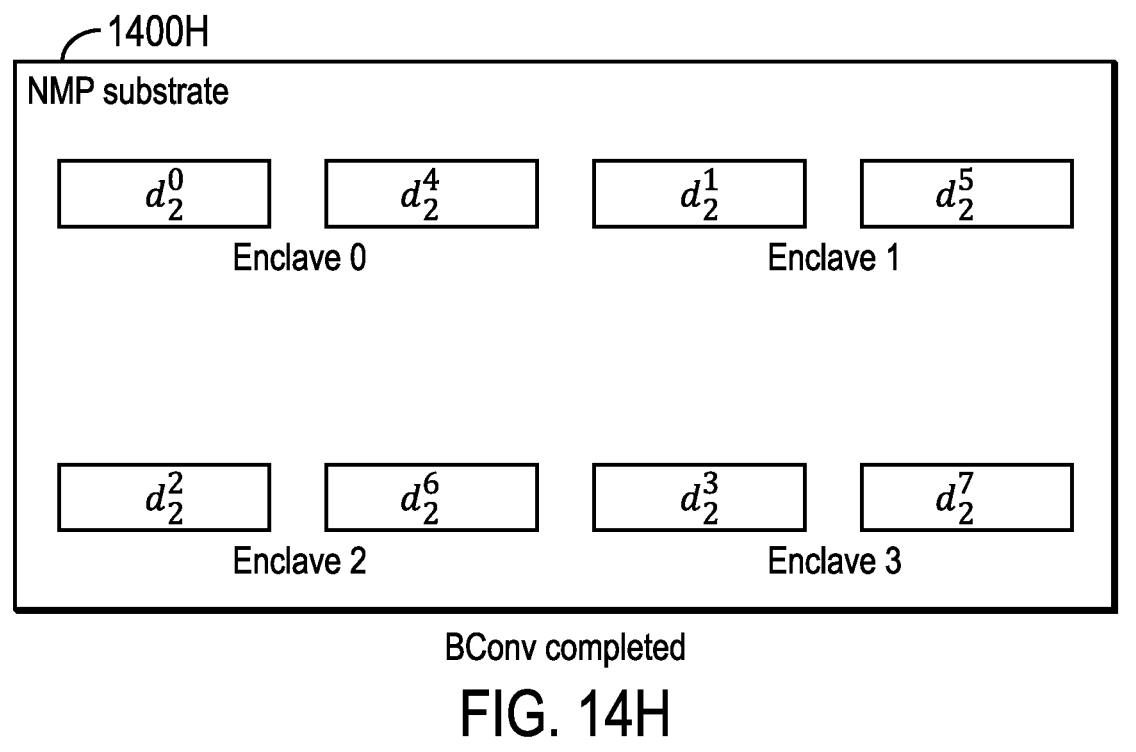

FIG. 14F shows how the decomposed polynomial d$_2$ is expanded to limbs 4, 5, 6, and 7 from limbs, where symbol $$d_2^{i,j}$$

denotes an intermediate expanded limb j created from limb i for polynomial d$_2$ through scalar multiplication. FIG. 14G then shows the addition operation of the base conversion of FIG. 13, where the intermediate expanded limbs $$d_2^{i,j}$$

are added to create limbs 4, 5, 6, and 7 in the enclave 0, 1, 2, and 3, respectively. The end result of these base conversion operations is shown in FIG. 14H where each enclave has coefficient elements for the original limbs 0 . . . 3 and for new limbs 4 . . . 7. In this way, the diagrams of FIGS. 14A . . . 14H show how a base conversion occurs on the α limbs.

Figures 15, 16:
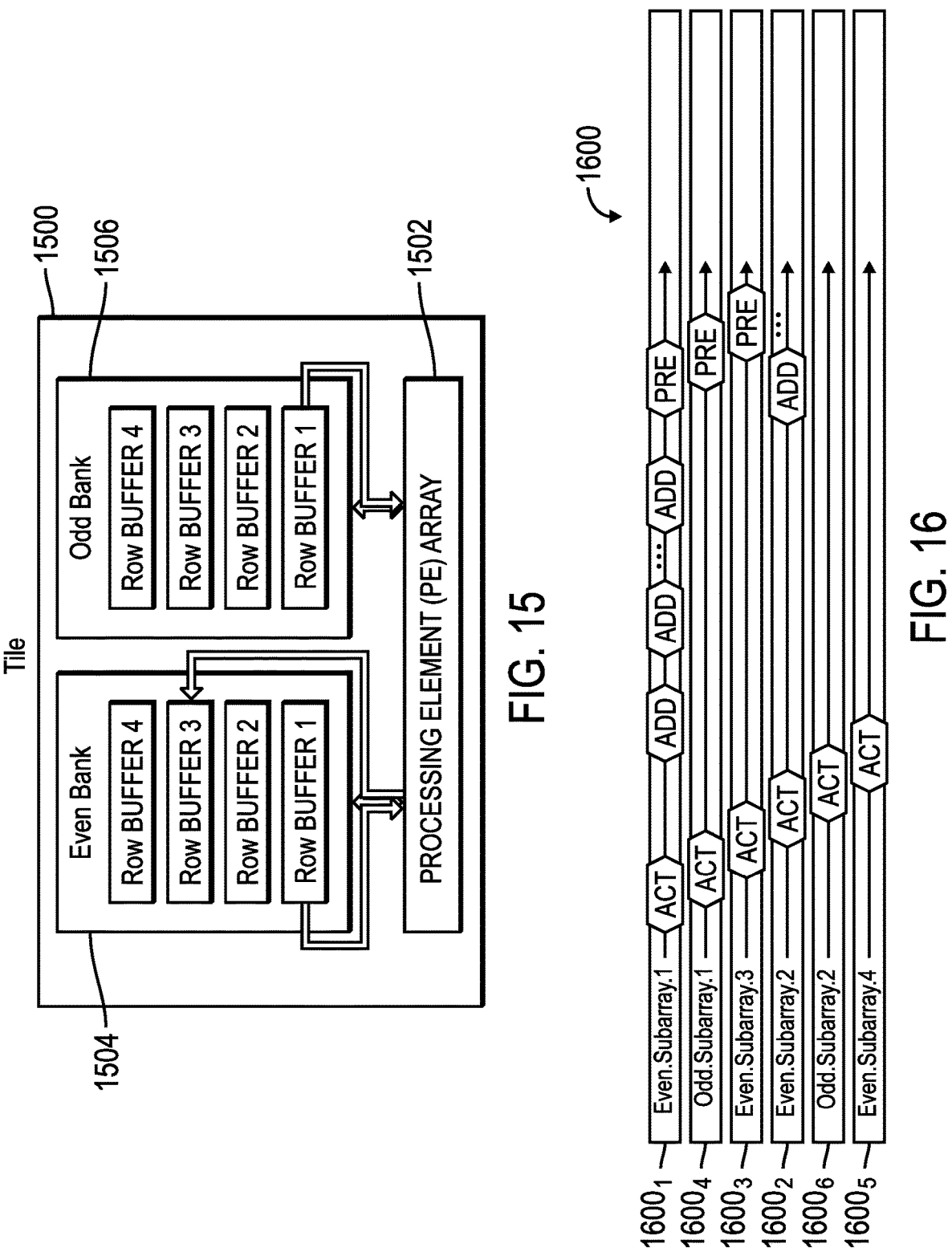
FIG. 15 illustrates an example of processing of decomposed data for coefficients of polynomials in row buffers of a tile.
FIG. 16 illustrates an example of a timing diagram of the row buffer operations described with respect to FIG. 15.

FIG. 15 shows an element-wise modular arithmetic operation occurring in a tile 1500, having a processing element 1502 and even 1504 and odd 1506 banks of four row buffers each. For example, coefficient elements for a given limb from two polynomials are read into the row buffers 1 and 2 of even 1504 and odd 1506 banks for element-wise operation and the output will be written to row buffer 3 and 4 of even bank. Row buffer 1 of each bank is used to read input data for the processing element array 1502. Row buffer 2 of each bank prepares to receive next coefficient elements to store when the processing element 1502 takes current coefficient elements from row buffer 1 of each bank. Row buffer 3 of even bank is used to store output of the processing element 1502. Row buffer 4 of even bank prepares storing output of the processing element 1502 array that takes input data from row buffer 2 of each bank. With the embodiment of FIG. 15, all processing remains within the row buffers of the tile to improve the speed and reduce energy consumption of the operations by not having to transfer data to an off-chip memory to the tile 1500.

FIG. 16 provides a command timing diagram 1600 for the element-wise modular ADD operation on the embodiment shown in FIG. 15. ADD commands issued at even bank, at timing 1600₁ and 1600₂, read input from row buffers 1 and row buffers 2 of both banks, respectively, to provide the input to the processing element 1502. ADD commands issued at the even bank, such as at timings 1600₁ and 1600₂, make the processing element 1502 add the inputs from the even and odd bank and write outputs to the even bank of row buffers 3 and 4, respectively.

While a set of subarrays, at timings 1600₁, 1600₃, 1600₄, such as even.subaray.1&3 and odd.subarray.1, performs ADD commands, another set of subarrays, at timings 1600₂, 1600₅, 1600₆, even.subarray.2&4 and odd.subarray.2, prepares for the next ADD commands, leading to hiding the preparation time within the compute time, so that the subarrays 2 and 4 can be ready for the next processing element 1502 operations when the processing element 1502 completes the operations at the subarrays 1 and 3.

An embodiment maps automorphism operations in cryptographic computation as a set of back-to-back NTT and INTT operations. However, in such a case, there are no modular arithmetic operations performed within the processing elements, but rather, the interconnections between the tiles are used to move the input coefficient elements into their correct places in the final output. Another embodiment may unify the NTT and INTT operations into a single shuffle operation and perform it in a similar manner as to what is described previously.

Figures 17, 18:
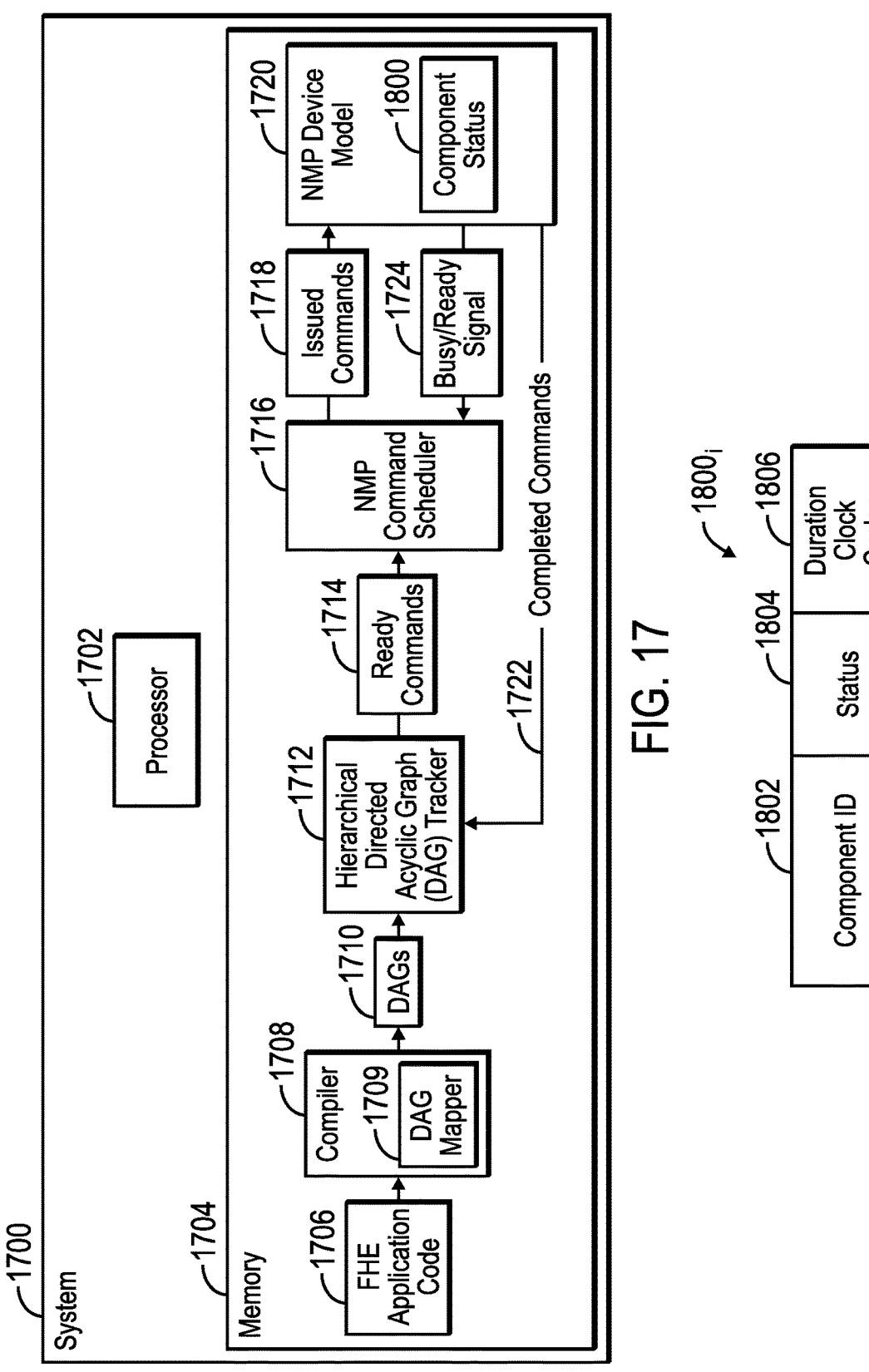
FIG. 17 illustrates an embodiment of a system to compile fully homomorphic encryption (FHE) operations in an application into directed acyclic graphs (DAGs).
FIG. 18 illustrates an embodiment of component status of a component represented in an NMP device model.

FIG. 17 illustrates an embodiment of a system 1700 including a processor 1702 and a memory 1704 having program components executed by the processor 1702. The memory 1704 includes FHE application code 1706 including homomorphic operations on ciphertexts. A compiler

1708 includes a directed acyclic graph (DAG) mapper 1709 to produce DAGS, such as shown in FIGS. 11, 12, 13, that map hierarchical commands to the hierarchical components of the NMP device 106ᵢ. The compiler 1708 produces a plurality of directed acyclic graphs (DAGs) 1710 providing hierarchical representations of nodes having commands for execution by a hierarchy of components in the NMP device 106ᵢ, including NMP substrates 200ᵢ, where the NMP substrates 200ᵢ include enclaves 204ᵢ, and the enclaves 204ᵢ include tiles 206ᵢ that have processing elements 212 to process the decomposed coefficient elements. A hierarchical DAG tracker 1712 receives the DAGs 1710 and tracks dependencies between the nodes of the graph at all hierarchies and determines a list of ready commands 1714 that have all control and data dependencies resolved. The hierarchical DAG tracker 1712 sends ready commands 1714 at the nodes of the DAGs 1710 to the NMP command scheduler 1716. Based on readiness signals from an NMP device model 1720, the NMP command scheduler 1716 issues commands with clock cycles to an NMP device model 1720, which provides a software representation of the hardware components of an NMP device 106ᵢ, including NMP substrates 200ᵢ, enclaves 204ᵢ, and tiles 206ᵢ, to model and simulate the operations of the hierarchical hardware components in an NMP device 106.

The NMP device model 1720 includes component status 1800. FIG. 18 shows that a component status 1800ᵢ entry indicates a component ID 1802 of a component, e.g., NMP substrate, enclave, tile, in the hierarchy of components, a status 1804 of the component, such as busy or ready, and a duration of clock cycles 1806 that the command is executed at the component 1802 while busy 1804. Upon the duration of clock cycles 1806 expiring, a ready signal 1724 is returned to the NMP command scheduler 1716 and a completed command signal 1722 is sent to the hierarchical DAG tracker 1712.

Figure 19:
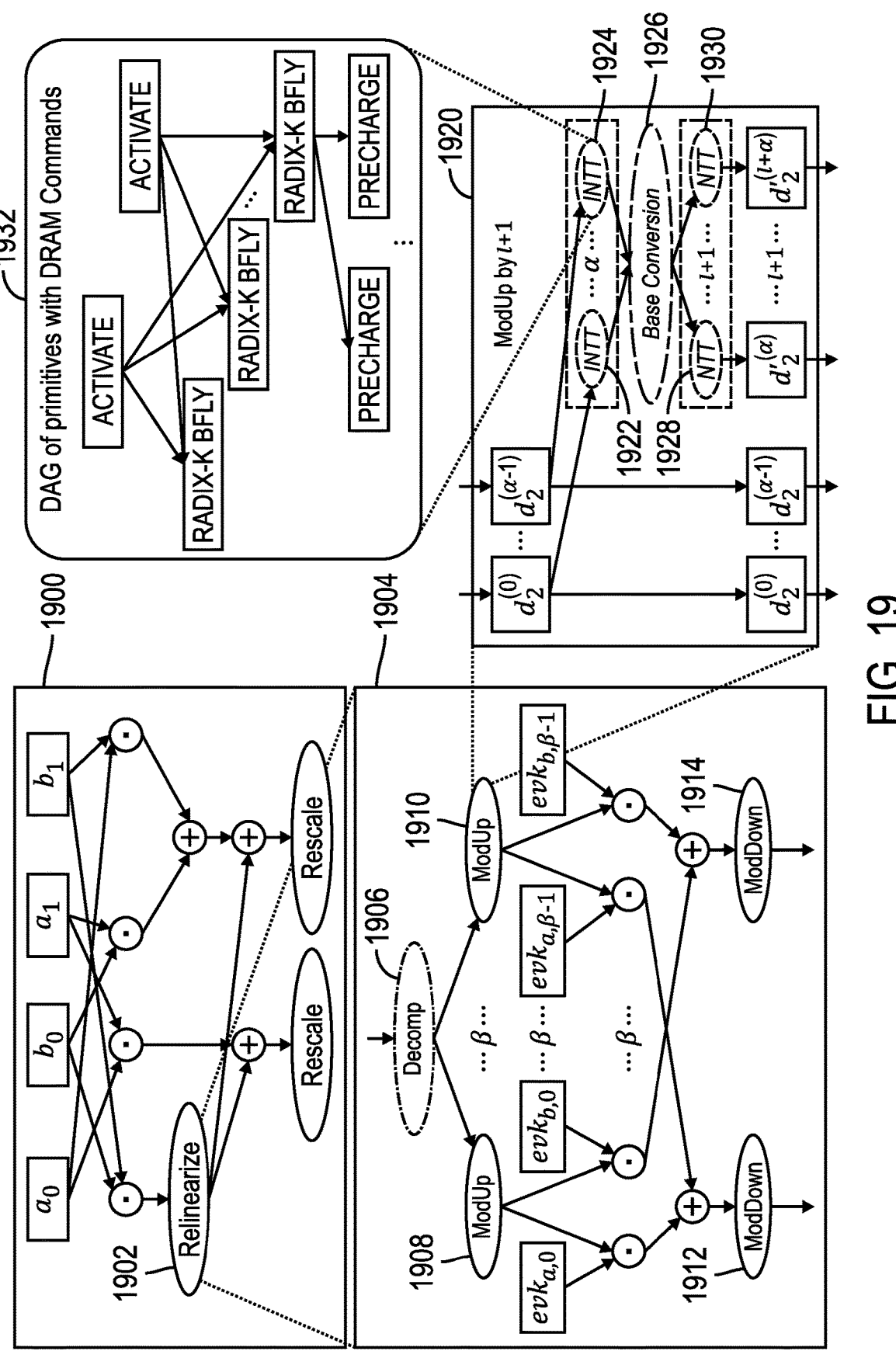
FIG. 19 illustrates an embodiment of directed acyclic graphs produced by the compiler to execute FHE operations in an application.

FIG. 19 illustrates an example of the DAGs 1710 generated by the compiler 1708 and shows a command graph 1900 having nodes of commands for an NMP substrate. The relinearize node 1902 may be represented as sub-graph 1904 having numbered nodes 1906, 1908, 1910, 1912, 1914 and other element-wise operations to implement the relinearize command 1902. Each of the nodes shows operations implementing the relinearize command 1902, where each operation may be implemented in an NMP Substrate 200ᵢ. The NMP substrate 200ᵢ to implement one of the operations, such as ModUp 1910, has an operation command list 302ᵢ. To implement the operations 1922, 1924, 1926, 1928, 1930, each component in the NMP substrate like the enclave 204ᵢ and tile 206ᵢ, has a command list 306ᵢ and 308ᵢ. Subgraph 1932 provides the tile commands including memory commands and operations on data in the memory banks to execute on one tile to implement the INTT operation 1924.

FIG. 20 illustrates an embodiment of operations performed by the compiler 1708, hierarchical DAG tracker 1712, NMP command scheduler 1716, and NMP device model 1720 to generate the hierarchical command list with clock cycles 1718 to compile and execute FHE application code 1706. Upon initiating (at block 2000) operations to compile FHE application code 1706, the compiler 1708 translates (at block 200₂) application code 1706 having operations on polynomials, such as fully homomorphic encryption (FHE) operations, into hierarchical directed acyclic graphs (DAGs) 1710 having a hierarchy of nodes indicating commands for execution by a hierarchy of hardware components in an NMP device 106ᵢ to execute the FHE application code 1706. The compiler 1708 insets (at block 2004) memory commands into nodes of the hierarchical DAGs 1710 for tiles 206$_i$ to execute to read and write data into memory banks in the tiles 206$_i$ and perform operations thereon. The hierarchical DAG tracker 1712 processes (at block 2006) the hierarchical DAGs 1710 to track dependencies between nodes of the graphs at the hierarchies and removes nodes that have been completed by the NMP device model 1720.

The DAG tracker 1712 generates (at block 2008) and transmits ready commands 1714 with dependencies resolved to the NMP command scheduler 1716. The commands 1714 may be in the form of a hierarchical command list 300 (FIG. 3), where the ready commands 1714 comprise one or more of the command lists 302$_i$, 304$_i$ 306$_i$, and/or 308$_i$ (FIG. 3). The NMP command scheduler 1716 prioritizes (at block 2010) the ready commands 1714 based on criteria, such as command type and program counter. The NMP command scheduler 1716 scans (at block 2012) the ready commands 1714 from highest priority to issue as commands 1718, e.g., one or more of the command lists 302$_i$, 304$_i$ 306$_i$, and/or 308$_i$, to the NMP device model 1720 based on the readiness of hierarchical hardware components represented in the NMP device model 1720, e.g., NMP substrate 200$_i$, enclave 204$_i$, tile 206$_i$. The NMP command scheduler 1716 further inserts clock cycles at which the commands 1714 should be executed on the hardware components represented in the NMP device model 1720.

The NMP command scheduler 1716 determines (at block 2014) components represented in the NMP device model 1720 indicated as ready. The NMP command scheduler 1716 sends (at block 2016) commands 1718 to the NMP device model 1720 for hardware components represented in the NMP device model 1720 indicated as ready.

For a received command for a hardware component, the NMP device model 1720 indicates (at block 2018), in component status 1800$_i$, the hardware component 1802 as busy in the status 1804 for a duration of clock cycles 1806 of the command and sends busy for the component to the NMP command scheduler 1716. In response to a duration of clock cycles 1806 expiring for a hardware component 1802, the NMP device model 1720 sets (at block 2020) the component 1802 status 1804 to ready, sends a command complete signal 1722 to the DAG tracker 1712, and sends ready signal 1724 to the NMP command scheduler 1716 for the hardware component 1802 that is no longer busy to inform the NMP command scheduler 1716 the hardware component 1802 is ready to receive further commands 1718.

With the described embodiments of FIG. 20, the compiler 1708 and DAG mapper 1709 generates hierarchical DAGs 1710 having nodes representing hierarchical hardware components in the NMP device 106$_i$ with the commands inserted in the nodes to be executed by the hardware component 200$_i$, 204$_i$, 206$_i$ represented by the nodes to perform FHE operations on decomposed polynomials. The compiled DAGs 1710 may be tested by having the DAG tracker 1712 and NMP command scheduler 1716 issue commands, such as command lists 302$_i$, 304$_i$, 306$_i$, and/or 308$_i$, to the NMP device model 1720 to simulate execution of an NMP device 106$_i$. In this way, the NMP device model 1720 may determine whether the commands in the DAG 1710 nodes execute properly so that the DAGs 1710 may be deployed in a production environment, such as in FIG. 1.

The present invention may be a system, a method, and/or a computer program product. The computer program product may include a computer-readable storage medium (or media) having computer-readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 21:
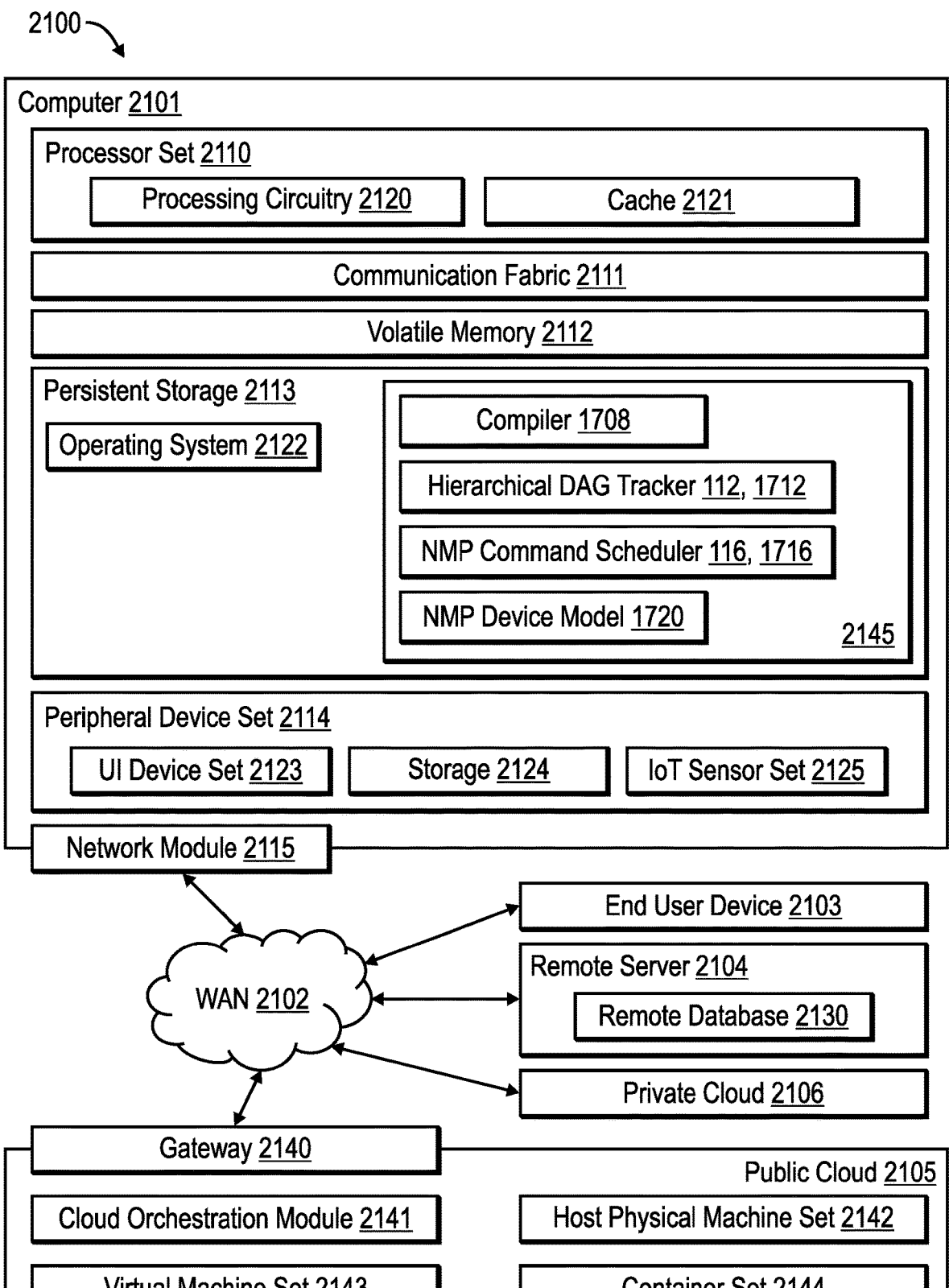
FIG. 21 illustrates a computing environment in which the components of FIGS. 1 and 17 may be implemented.

With respect to FIG. 21, computing environment 2100 contains an example of an environment for the execution of at least some of the computer code involved in performing the inventive methods, such as the programs 1708, 112, 1712, 1716, and 1720 in FIGS. 1 and 17, in block 2145, to compile an FHE application to produce directed acyclic graphs (DAGs) with commands and execute the commands, and executing the commands in the DAG. In addition to block 2145, computing environment 2100 includes, for example, computer 2101, wide area network (WAN) 2102, end user device (EUD) 2103, remote server 2104, public cloud 2105, and private cloud 2106. In this embodiment, computer 2101 includes processor set 2110 (including processing circuitry 2120 and cache 2121), communication fabric 2111, volatile memory 2112, persistent storage 2113 (including operating system 2122 and block 2145, as identified above), peripheral device set 2114 (including user interface (UI) device set 2123, storage 2124, and Internet of Things (IoT) sensor set 2125), and network module 2115. Remote server 2104 includes remote database 2130. Public cloud 2105 includes gateway 2140, cloud orchestration module 2141, host physical machine set 2142, virtual machine set 2143, and container set 2144.

COMPUTER 2101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 2130. As is well understood in the art of computer technology, and depending upon the technology, performance of a computer-implemented method may be distributed among multiple computers and/or between multiple locations. On the other hand, in this presentation of computing environment 2100, detailed discussion is focused on a single computer, specifically computer 2101, to keep the presentation as simple as possible. Computer 2101 may be located in a cloud, even though it is not shown in a cloud in FIG. 21. On the other hand, computer 2101 is not required to be in a cloud except to any extent as may be affirmatively indicated.

PROCESSOR SET 2110 includes one, or more, computer processors of any type now known or to be developed in the future. Processing circuitry 2120 may be distributed over multiple packages, for example, multiple, coordinated integrated circuit chips. Processing circuitry 2120 may implement multiple processor threads and/or multiple processor cores. Cache 2121 is memory that is located in the processor chip package(s) and is typically used for data or code that should be available for rapid access by the threads or cores running on processor set 2110. Cache memories are typically organized into multiple levels depending upon relative proximity to the processing circuitry. Alternatively, some, or all, of the cache for the processor set may be located "off chip." In some computing environments, processor set 2110 may be designed for working with qubits and performing quantum computing.

Computer-readable program instructions are typically loaded onto computer 2101 to cause a series of operational steps to be performed by processor set 2110 of computer 2101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 2121 and the other storage media discussed below. The program instructions, and associated data, are accessed by processor set 2110 to control and direct performance of the inventive methods. In computing environment 2100, at least some of the instructions for performing the inventive methods may be stored in block 2145 in persistent storage 2113. COMMUNICATION FABRIC 2111 is the signal conduction path that allows the various components of computer 2101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 2112 is any type of volatile memory now known or to be developed in the future.

Examples include dynamic type random access memory (RAM) or static type RAM. Typically, volatile memory 2112 is characterized by random access, but this is not required unless affirmatively indicated. In computer 2101, the volatile memory 2112 is located in a single package and is internal to computer 2101, but, alternatively or additionally, the volatile memory may be distributed over multiple packages and/or located externally with respect to computer 2101.

PERSISTENT STORAGE 2113 is any form of non-volatile storage for computers that is now known or to be developed in the future. The non-volatility of this storage means that the stored data is maintained regardless of whether power is being supplied to computer 2101 and/or directly to persistent storage 2113. Persistent storage 2113 may be a read only memory (ROM), but typically at least a portion of the persistent storage allows writing of data, deletion of data and re-writing of data. Some familiar forms of persistent storage include magnetic disks and solid-state storage devices. Operating system 2122 may take several forms, such as various known proprietary operating systems or open source Portable Operating System Interface-type operating systems that employ a kernel. The code included in block 2145 typically includes at least some of the computer code involved in performing the inventive methods.

PERIPHERAL DEVICE SET 2114 includes the set of peripheral devices of computer 2101. Data communication connections between the peripheral devices and the other components of computer 2101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 2123 may include components such as a display screen, speaker, microphone, wearable devices (such as goggles and smart watches), keyboard, mouse, printer, touchpad, game controllers, and haptic devices. Storage 2124 is external storage, such as an external hard drive, or insertable storage, such as an SD card. Storage 2124 may be persistent and/or volatile. In some embodiments, storage 2124 may take the form of a quantum computing storage device for storing data in the form of qubits. In embodiments where computer 2101 is required to have a large amount of storage (for example, where computer 2101 locally stores and manages a large database) then this storage may be provided by peripheral storage devices designed for storing very large amounts of data, such as a storage area network (SAN) that is shared by multiple, geographically distributed computers. IoT sensor set 2125 is made up of sensors that can be used in Internet of Things applications. For example, one sensor may be a thermometer and another sensor may be a motion detector.

NETWORK MODULE 2115 is the collection of computer software, hardware, and firmware that allows computer 2101 to communicate with other computers through WAN 2102. Network module 2115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 2115 are performed on the same physical hardware device. In other embodiments (for example, embodiments that utilize software-defined networking (SDN)), the control functions and the forwarding functions of network module 2115 are performed on physically separate devices, such that the control functions manage several different network hardware devices. Computer-readable program instructions for performing the inventive methods can typically be downloaded to computer 2101 from an external computer or external storage device through a network adapter card or network interface included in network module 2115.

WAN 2102 is any wide area network (for example, the internet) capable of communicating computer data over non-local distances by any technology for communicating computer data, now known or to be developed in the future. In some embodiments, the WAN 2102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 2103 is any computer system that is used and controlled by an end user (for example, a customer of an enterprise that operates computer 2101), and may take any of the forms discussed above in connection with computer 2101. EUD 2103 typically receives helpful and useful data from the operations of computer 2101. For example, in a hypothetical case where computer 2101 is designed to provide a recommendation to an end user, this recommendation would typically be communicated from network module 2115 of computer 2101 through WAN 2102 to EUD 2103. In this way, EUD 2103 can display, or otherwise present, the recommendation to an end user. In some embodiments, EUD 2103 may be a client device, such as thin client, heavy client, mainframe computer, desktop computer and so on.

REMOTE SERVER 2104 is any computer system that serves at least some data and/or functionality to computer 2101. Remote server 2104 may be controlled and used by the same entity that operates computer 2101. Remote server 2104 represents the machine(s) that collect and store helpful and useful data for use by other computers, such as computer 2101. For example, in a hypothetical case where computer 2101 is designed and programmed to provide a recommendation based on historical data, then this historical data may be provided to computer 2101 from remote database 2130 of remote server 2104.

PUBLIC CLOUD 2105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 2105 is performed by the computer hardware and/or software of cloud orchestration module 2141. The computing resources provided by public cloud 2105 are typically implemented by virtual computing environments that run on various computers making up the computers of host physical machine set 2142, which is the universe of physical computers in and/or available to public cloud 2105. The virtual computing environments (VCEs) typically take the form of virtual machines from virtual machine set 2143 and/or containers from container set 2144. It is understood that these VCEs may be stored as images and may be transferred among and between the various physical machine hosts, either as images or after instantiation of the VCE. Cloud orchestration module 2141 manages the transfer and storage of images, deploys new instantiations of VCEs and manages active instantiations of VCE deployments. Gateway 2140 is the collection of computer software, hardware, and firmware that allows public cloud 2105 to communicate through WAN 2102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 2106 is similar to public cloud 2105, except that the computing resources are only available for use by a single enterprise. While private cloud 2106 is depicted as being in communication with WAN 2102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 2105 and private cloud 2106 are both part of a larger hybrid cloud.

CLOUD COMPUTING SERVICES AND/OR MICRO-SERVICES (not separately shown in FIG. 21): private and public clouds 2106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The letter designators, such as i and n, among others, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for compiling a program having polynomial operations, the computer program product comprising a computer readable storage medium having computer readable program code embodied therein that when executed performs operations, the operations comprising:

compiling an application including operations on a polynomial having coefficients, wherein the coefficients are decomposed into a number of levels of coefficient elements, to generate hierarchical directed acyclic graphs (DAGs) having nodes indicating commands for execution by a hierarchy of hardware components in a near memory processing (NMP) device, wherein the hierarchy of hardware components includes a plurality of enclaves of tiles, wherein an enclave comprises a plurality of tiles, wherein the tiles include memories and processing elements to perform operations on the decomposed coefficients stored in the memories of the tiles, wherein the hardware components include controllers to process the commands in the DAGs generated for execution by the hardware components; and providing the DAGs to a hierarchical DAG tracker to generate commands for the NMP device.

2. The computer program product of claim 1, wherein the commands generated for the tiles include memory commands to read and write the coefficient elements in the memories in the tiles and to have the processing elements in the tiles process the coefficient elements in the memories.

3. The computer program product of claim 1, wherein the generated commands include commands for NMP substrates on the NMP device, wherein the NMP substrates include the enclaves.

4. The computer program product of claim 3, wherein the commands comprise a hierarchical command list, wherein the hierarchical command list includes an NMP substrate command list for one of the NMP substrates on the NMP device, wherein the NMP substrate command list provides an enclave command list for enclaves on the NMP substrate having the NMP substrate command list, and wherein the enclave command list provides primitive operations to perform on the coefficient elements.

5. The computer program product of claim 4, wherein the enclave command list provides a tile command list for each primitive operation indicated on the enclave command list, and wherein the tile command list includes memory commands and operations to perform on the coefficient elements within a tile to implement the primitive operation for which the tile command list is provided.

6. The computer program product of claim 1, wherein each level of coefficient elements comprises a limb, and wherein the commands include commands to process coefficient elements for one limb in the tiles of only one enclave.

7. A computer program product for compiling a program having polynomial operations, the computer program product comprising a computer readable storage medium having computer readable program code embodied therein that when executed performs operations, the operations comprising:

compiling, by a compiler, an application including operations on a polynomial having coefficients, wherein the coefficients are decomposed into a number of levels of coefficient elements, to generate commands in a hierarchical directed acyclic graph (DAG) having nodes indicating commands for execution by a hierarchy of hardware components in a near memory processing (NMP) device including tiles having memories with row buffers and processing elements to perform operations on the coefficient elements; and forwarding the commands to an NMP device model that models the hierarchy of hardware components in the NMP device and processes the commands to generate information on completion of the commands.

8. The computer program product of claim 7, wherein the operations further comprise:

indicating, by the NMP device model, a hardware component, in the hierarchy of hardware components, as busy for a duration of clock cycles to process a command received for the hardware components.

9. The computer program product of claim 7, wherein the operations further comprise:

assigning, by a command scheduler, clock cycles for the commands indicating when the commands are executed in the hierarchy of components, wherein the NMP device model indicates a hardware component as busy in response to the hardware component executing a command at a clock cycle assigned by the command scheduler.

10. The computer program product of claim 7, wherein the hardware components of the hierarchy of components include NMP substrates on the NMP device, wherein the NMP substrates include a plurality of enclaves, wherein each enclave comprises a plurality of interconnected tiles, wherein the tiles include memories and processing elements to perform operations on decomposed coefficients stored in the memories, and wherein the NMP device model provides a model of the NMP substrates on the NMP device, the enclaves on the NMP substrates, and the tiles in the enclaves.

11. The computer program product of claim 7, wherein the operations further comprise:

processing, by a DAG tracker, the DAGs and commands to process at the DAG nodes for the hardware components in the hierarchy of components to track a status of processing the commands and track dependencies of the components;

determining, by a command scheduler, clock cycles for ready commands from the DAG tracker;

sending, by the command scheduler, commands to the NMP device model in response to receiving a signal from the NMP device model that a component represented in the NMP device model is ready to process commands; and returning, by the NMP device model, indication of completed commands to the DAG tracker.

12. A system for compiling a program having polynomial operations, comprising:

a processor; and a computer readable storage medium having computer readable program code embodied therein that when executed performs operations, the operations comprising:

compiling an application including operations on a polynomial having coefficients, wherein the coefficients are decomposed into a number of levels of coefficient elements, to generate hierarchical directed acyclic graphs (DAGs) having nodes indicating commands for execution by a hierarchy of hardware components in a near memory processing (NMP) device, wherein the hierarchy of hardware components includes a plurality of enclaves of tiles, wherein an enclave comprises a plurality of tiles, wherein the tiles include memories and processing elements to perform operations on the decomposed coefficients stored in the memories of the tiles, wherein the hardware components include controllers to process the commands in the DAGs generated for execution by the hardware components; and providing the DAGs to a hierarchical DAG tracker to generate commands for the NMP device.

13. The system of claim 12, wherein the commands generated for the tiles include memory commands to read and write the coefficient elements in the memories in the tiles and to have the processing elements in the tiles process the coefficient elements in the memories.

14. The system of claim 12, wherein the generated commands include commands for NMP substrates on the NMP device, wherein the NMP substrates include the enclaves.

15. The system of claim 14, wherein the commands comprise a hierarchical command list, wherein the hierarchical command list includes an NMP substrate command list for one of the NMP substrates on the NMP device, wherein the NMP substrate command list provides an enclave command list for enclaves on the NMP substrate having the NMP substrate command list, and wherein the enclave command list provides primitive operations to perform on the coefficient elements.

16. The system of claim 15, wherein the enclave command list provides a tile command list for each primitive operation indicated on the enclave command list, and wherein the tile command list includes memory commands and operations to perform on the coefficient elements within a tile to implement the primitive operation for which the tile command list is provided.

17. A system for compiling a program having polynomial operations, comprising:

a processor; and a computer readable storage medium having computer readable program code embodied therein that when executed performs operations, the operations comprising:

compiling, by a compiler, an application including operations on a polynomial having coefficients, wherein the coefficients are decomposed into a number of levels of coefficient elements, to generate commands in a hierarchical directed acyclic graph (DAG) having nodes indicating commands for execution by a hierarchy of hardware components in a near memory processing (NMP) device including tiles having memories with row buffers and processing elements to perform operations on the coefficient elements; and forwarding the commands to an NMP device model that models the hierarchy of hardware components in the NMP device and processes the commands to generate information on completion of the commands.

18. The system of claim 17, wherein the operations further comprise:

indicating, by the NMP device model, a hardware component, in the hierarchy of hardware components, as busy for a duration of clock cycles to process a command received for the hardware components.

19. The system of claim 17, wherein the hardware components of the hierarchy of components include NMP substrates on the NMP device, wherein the NMP substrates include a plurality of enclaves, wherein each enclave comprises a plurality of interconnected tiles, wherein the tiles include memories and processing elements to perform operations on decomposed coefficients stored in the memories of the tiles, and wherein the NMP device model provides a model of the NMP substrates on the NMP device, the enclaves on the NMP substrates, and the tiles in the enclaves.

20. The system of claim 17, wherein the operations further comprise:

processing, by a DAG tracker, the DAGs and commands to process at the DAG nodes for the hardware components in the hierarchy of components to track a status of processing the commands and track dependencies of the components;

determining, by a command scheduler, clock cycles for ready commands from the DAG tracker;

sending, by the command scheduler, commands to the NMP device model in response to receiving a signal from the NMP device model that a component represented in the NMP device model is ready to process commands; and returning, by the NMP device model, indication of completed commands to the DAG tracker.

21. A computer implemented method for compiling a program having polynomial operations, comprising:

compiling an application including operations on a polynomial having coefficients, wherein the coefficients are decomposed into a number of levels of coefficient elements, to generate hierarchical directed acyclic graphs (DAGs) having nodes indicating commands for execution by a hierarchy of hardware components in a near memory processing (NMP) device, wherein the hierarchy of hardware components includes a plurality of enclaves of tiles, wherein an enclave comprises a plurality of tiles, wherein the tiles include memories and processing elements to perform operations on the decomposed coefficients stored in the memories of the tiles, wherein the hardware components include controllers to process the commands in the DAGs generated for execution by the hardware components; and
providing the DAGs to a hierarchical DAG tracker to generate commands for the NMP device.

22. The method of claim 21, wherein the commands generated for the tiles include memory commands to read and write the coefficient elements in the memories in the tiles and to have the processing elements in the tiles process the coefficient elements in the memories.

23. The method of claim 21, wherein the generated commands include commands for NMP substrates on the NMP device, wherein the NMP substrates include the enclaves.

24. The method of claim 23, wherein the commands comprise a hierarchical command list, wherein the hierarchical command list includes an NMP substrate command list for one of the NMP substrates on the NMP device, wherein the NMP substrate command list provides an enclave command list for enclaves on the NMP substrate having the NMP substrate command list, and wherein the enclave command list provides primitive operations to perform on the coefficient elements.

25. The method of claim 24, wherein the enclave command list provides a tile command list for each primitive operation indicated on the enclave command list, and wherein the tile command list includes memory commands and operations to perform on the coefficient elements within a tile to implement the primitive operation for which the tile command list is provided.

\* \* \* \* \*